US012779361B2

(12) United States Patent
Anderson et al.

(10) Patent No.: US 12,779,361 B2
(45) Date of Patent: Nov. 3, 2026

(54) HYPERGRAVITY THERMAL PAYLOAD SYSTEM

(71) Applicant: Varda Space Industries, Inc., El Segundo, CA (US)

(72) Inventors: Jeffrey Michael Anderson, San Pedro, CA (US); Haley Coddington Bauser, Los Angeles, CA (US); Larry Robin Chan, Torrance, CA (US); Eric Douglas Miller, Lomita, CA (US); Ami Sanat Bhavsar, Hermosa Beach, CA (US); Kenneth Hoyt Condon, Long Beach, CA (US); Jordan Michael Croom, Los Angeles, CA (US); Andrew Steven McCalip, Marina Del Rey, CA (US); Adrian Radocea, Long Beach, CA (US)

(73) Assignee: Varda Space Industries, Inc., El Segundo, CA (US)

( * ) Notice: Subject to any disclaimer, the term of this patent is extended or adjusted under 35 U.S.C. 154(b) by 748 days.

(21) Appl. No.: 18/361,599

(22) Filed: Jul. 28, 2023

(65) Prior Publication Data

US 2025/0032952 A1 Jan. 30, 2025

(51) Int. Cl.
*B01D 9/00* (2006.01)
*B01J 19/00* (2006.01)

(52) U.S. Cl.
CPC ......... *B01D 9/0013* (2013.01); *B01D 9/0063* (2013.01); *B01J 19/004* (2013.01); *B01D 9/005* (2013.01); *B01D 2009/0086* (2013.01)

(58) Field of Classification Search
CPC ............................... B01J 19/004; B01J 19/28; B01J 2219/00137; B01D 9/005; B01D 9/0013;
(Continued)

(56) References Cited

U.S. PATENT DOCUMENTS

2022/0193762 A1 6/2022 Wei et al.

FOREIGN PATENT DOCUMENTS

CN 106629791 B 4/2018

OTHER PUBLICATIONS

Elsaesser, A. et al., "SpectroCube: a European 6U nanosatellite spectroscopy platform for astrobiology and astrochemistry," Acta Astronautica, vol. 170, Jan. 23, 2020, pp. 275-288.

(Continued)

*Primary Examiner* — Lessanework Seifu
(74) *Attorney, Agent, or Firm* — Fenwick & West LLP

(57) ABSTRACT

Payload systems for processing chemical substances under various gravity levels, such as hypergravity and/or microgravity. The payload systems may include a hypergravity thermal payload system configured to enable melt or cooling of a sample under hypergravity. Alternatively, or in addition, the payload systems may include a gravity-independent thermal payload system for enabling melt or cooling of a sample under various gravity levels, such as microgravity. Alternatively, or in addition, the payload systems may include a hypergravity crystallization payload system configured to enable crystallization of a chemical substance under hypergravity. Alternatively, or in addition, the payload systems may include a gravity-independent crystallization system configured to enable crystallization of a chemical substance in various gravity levels, such as microgravity.

20 Claims, 15 Drawing Sheets

(58) Field of Classification Search
CPC ................ B01D 9/0054; B01D 9/0063; B01D 2009/0086
See application file for complete search history.

(56) References Cited

OTHER PUBLICATIONS

Padgen, M.R. et al., "The EcAMSat fluidic system to study antibiotic resistance in low earth orbit: Development and lessons learned from space flight," Acta Astronautica, vol. 173, Feb. 19, 2020, pp. 449-459.
PCT International Search Report and Written Opinion, PCT Application No. PCT/US2024/038393, Oct. 28, 2024, nine pages.
Wang, S.K. et al., "Development of the Varying Gravity Rack (VGR) for the Chinese Space Station," Microgravity Science and Technology, vol. 31, Dec. 19, 2018, pp. 95-107.

1600

HYPERGRAVITY THERMAL PAYLOAD SYSTEM

TECHNICAL FIELD

This disclosure relates generally to devices for processing chemical substances, specifically to payload systems for processing chemical substances under various gravity levels, such as hypergravity and/or microgravity.

BACKGROUND

Crystallization is a critical process used in various industries, including pharmaceuticals, material science, and chemical engineering. The formation of crystals is governed by complex thermodynamic and kinetic principles and can be influenced by various factors such as temperature, pressure, and solute concentration.

Hypergravity and microgravity conditions are unique environments that offer distinct advantages for the crystallization process. In hypergravity conditions, gravity is increased, whereas in microgravity conditions, gravity is nearly absent. These conditions can significantly impact the nucleation, growth, and morphological properties of crystals, leading to improved crystallization processes and products. For example, hypergravity conditions have been shown to promote the formation of more uniform and pure crystals by facilitating an increase in solute concentration to achieve supersaturation and promote nucleation, while microgravity conditions can lead to more perfect crystals with fewer defects due to the absence of gravity-driven convection and buoyancy forces that cause non-uniform crystal growth.

Despite the advantages of hypergravity and microgravity environments, their utilization as crystallization tools is still limited due to the lack of suitable equipment and facilities to conduct experiments in these environments. Additionally, the processes involved in designing and executing experiments in these unique conditions are complex and require a high level of expertise.

SUMMARY

Embodiments described herein relate to a hypergravity thermal payload system for enabling melt or cooling of a sample under hypergravity. The hypergravity thermal payload system includes a thermal chamber, including a thermally conductive sample plate configured to hold a thermally non-conductive vial; a temperature sensor coupled with the thermal chamber to generate sensing data describing temperatures associated with the thermal chamber; a convective cover configured to enclose the thermal chamber to prevent thermal deviation; a thermoelectric device configured to heat or cool the thermal chamber; a heatsink configured to dissipate heat; a heat spreader configured to transfer heat from the thermal chamber to the heatsink; and a controller configured to: receive and monitor the sensing data from the temperature sensor; and control the thermoelectric device based in part on the monitored sensing data.

In some embodiments, the hypergravity thermal payload system is placed on a centrifuge, and the convective cover is configured to prevent thermal deviation caused by rotation speed variation on the centrifuge. The thermal payload system further includes a convective cover configured to enclose the thermal chamber.

In some embodiments, the thermoelectric device is configured to operate in a plurality of modes, and the controller causes the thermoelectric device to switch between the plurality of modes. In some embodiments, the plurality of modes includes (1) a first mode, in which the thermoelectric device is configured to rapidly reduce a temperature of a side of the thermal chamber by pumping heat to a side of the heatsink, (2) a second mode, in which the thermoelectric device operates in reverse at a first current to isolate the side of the thermal chamber from the heatsink, and (3) a third mode, in which the thermoelectric device operates in reverse at a second current greater than the first current to increase the temperature of the thermal chamber.

Embodiments described herein also relate to a gravity-independent thermal payload system for enabling melt or cooling of a sample. The gravity-independent thermal payload system includes a sample plate made of a thermally conductive material; a sample vial coupled with the sample plate, the sample vial including a body having an open end and a closed end, configured to hold a sample in powder form or liquid form; a ball seal disposed on top of the sample inside the body; and a pressure cap placed on top of the open end of the body, configured to continuously pressurize the ball seal, which in turn pressurizes the sample inside the body when the sample melts from powder form to liquid form; and a thermoelectric device configured to heat or cool the sample plate; a heatsink configured to dissipate heat; and a heat spreader configured to transfer heat from the sample plate to the heatsink. In some embodiments, the ball seal is elastic to accommodate variations in sample volume that occur as a result of temperature variations.

In some embodiments, the ball seal is made of polytetrafluoroethylene (PTFE). In some embodiments, the closed end of the body of the sample vial has a first diameter, the open end of the body of the sample vial has a second diameter that is greater than the first diameter, and the diameter of the ball seal is greater than the first diameter and less than the second diameter. In some embodiments, a first portion of the body of the sample vial at the closed end is cylindrical shaped, and a second portion of the body of the sample vial at the open end is truncated cone shaped, gradually opening up toward the open end. In some embodiments, an outer surface of the body of the sample vial and an inner surface of the pressure cap are threaded to fit each other.

Embodiments described herein also relate to a hypergravity crystallization payload system for enabling crystallization of a chemical substance under hypergravity. The hypergravity crystallization payload system includes a solution well configured to hold a liquid solution containing the chemical substance; an anti-solvent well configured to hold a liquid anti-solvent; a growth chamber; and a mixing chip including a first inlet configured to receive the liquid solution from the solution well; a second inlet configured to receive the liquid anti-solvent from the anti-solvent well; an outlet; and a channel having a first end and a second end, wherein the first end of the channel is connected to both the first inlet and the second inlet, and the second end of the channel is connected to the outlet, and wherein the liquid solution and the liquid anti-solvent received from the first and second inlet pass through the channel to exit at the outlet and enter the growth chamber.

In some embodiments, the hypergravity crystallization payload system further includes a yield filter coupled with the growth chamber configured to filter out crystals of the chemical substance.

In some embodiments, the solution well is coupled with a first pump configured to pump the liquid solution from the solution well to the first inlet of the mixing chip, and the anti-solvent well is coupled with a second pump configured to pump the liquid anti-solvent from the anti-solvent well to the second inlet of the mixing chip.

In some embodiments, the hypergravity crystallization payload system further includes a thermal control subsystem configured to control temperature of the solution well, temperature of the anti-solvent well, or temperature of the growth chamber.

Embodiments described herein also relate to a gravity-independent crystallization method, including mixing, at a first temperature, a solid pre-manufacturing chemical substance and a liquid solvent to dissolve the pre-manufacturing chemical substance in the liquid solvent to produce an undersaturated solution liquid; reducing the undersaturated solution liquid from the first temperature to a second temperature lower than the first temperature; mixing, at the second temperature, the undersaturated solution liquid and an antisolvent liquid to produce supersaturated solution liquid, causing the supersaturated solution liquid to become saturated solution slurry; separating a manufactured chemical substance from supernatant (which is a liquid resulting from crystallization and remaining after the substances that crystalize have been removed) in the saturated solution slurry; and recovering the manufactured chemical substance and the supernatant.

In some embodiments, recovering the manufactured chemical substance and the supernatant is performed at a third temperature higher than the first temperature and the second temperature. In some embodiments, the third temperature is in a range between 50 Celsius degrees (° C.) and 120° C. In some embodiments, the first temperature is about 35° C. In some embodiments, the second temperature is about 25° C. In some embodiments, reducing the undersaturated solution liquid to a second temperature lower than the first temperature is at a rate range between −1 and −5° C. per minute.

In some embodiments, the method is performed in flight of a space vehicle. In some embodiments, mixing the solid pre-manufacturing chemical substance and the liquid solvent is performed around a time after the space vehicle is launched when gravity level reaches a microgravity level. In some embodiments, mixing the undersaturated solution liquid and the antisolvent liquid is performed when the space vehicle is in space under microgravity. In some embodiments, recovering the manufactured chemical substance and the supernatant is performed when the space vehicle is reentering into an atmosphere of Earth.

Embodiments described herein also relate to a gravity-independent crystallization payload system for enabling crystallization of a chemical substance. The gravity-independent crystallization payload system includes a solution reservoir configured to hold a liquid solution containing the chemical substance; an anti-solvent reservoir configured to hold a liquid anti-solvent; a first thermal control system configured to control temperature of the solution reservoir and the anti-solvent reservoir; a fluid manifold configured to receive the liquid solution from the solution reservoir and the liquid anti-solvent from the anti-solvent reservoir and mix the received liquid solution and the liquid anti-solvent; a growth chamber configured to receive a mixture of the liquid solution and the liquid anti-solvent from the fluid manifold to produce a saturated solution slurry; and a second thermal control system configured to control temperature of the growth chamber.

In some embodiments, the gravity-independent crystallization payload system further includes a first bubble trap configured to remove bubbles from the liquid solution; and a second bubble trap configured to remove bubbles from the anti-solvent reservoir. In some embodiments, the first bubble trap or the second bubble trap includes a gas-permeable but not liquid-permeable membrane with a vacuum on a first side and a layer of fluid on a second side. In some embodiments, a thickness of the layer of fluid is no greater than a threshold, such that gas bubbles larger in diameter than the threshold are removed due to a pressure difference between the first side and the second side of the membrane.

In some embodiments, the gravity-independent crystallization payload system further includes a plug coupled to the solution reservoir configured to receive the chemical substance in solid form; and a pump coupled to the solution reservoir configured to cause the liquid solution to circulate through the plug to dissolve the chemical substance in the liquid solution to generate undersaturated solution liquid. In some embodiments, the gravity-independent crystallization payload system further includes a yield filter coupled with the growth chamber configured to capture crystals of the chemical substance from the saturated solution slurry.

In some embodiments, the gravity-independent crystallization payload system, wherein the first thermal control system is configured to lower temperature of the liquid solution and the liquid anti-solvent from a first temperature to a second temperature under micrograviy. In some embodiments, the second thermal control system is configured to maintain the growth chamber at the second temperature under microgravity. In some embodiments, the first temperature is about 35° C., and the second temperature is at about 25° C. In some embodiments, lowering the temperature is at a rate range between −1° C. per minute and −5° C. per minute.

Figure 1:
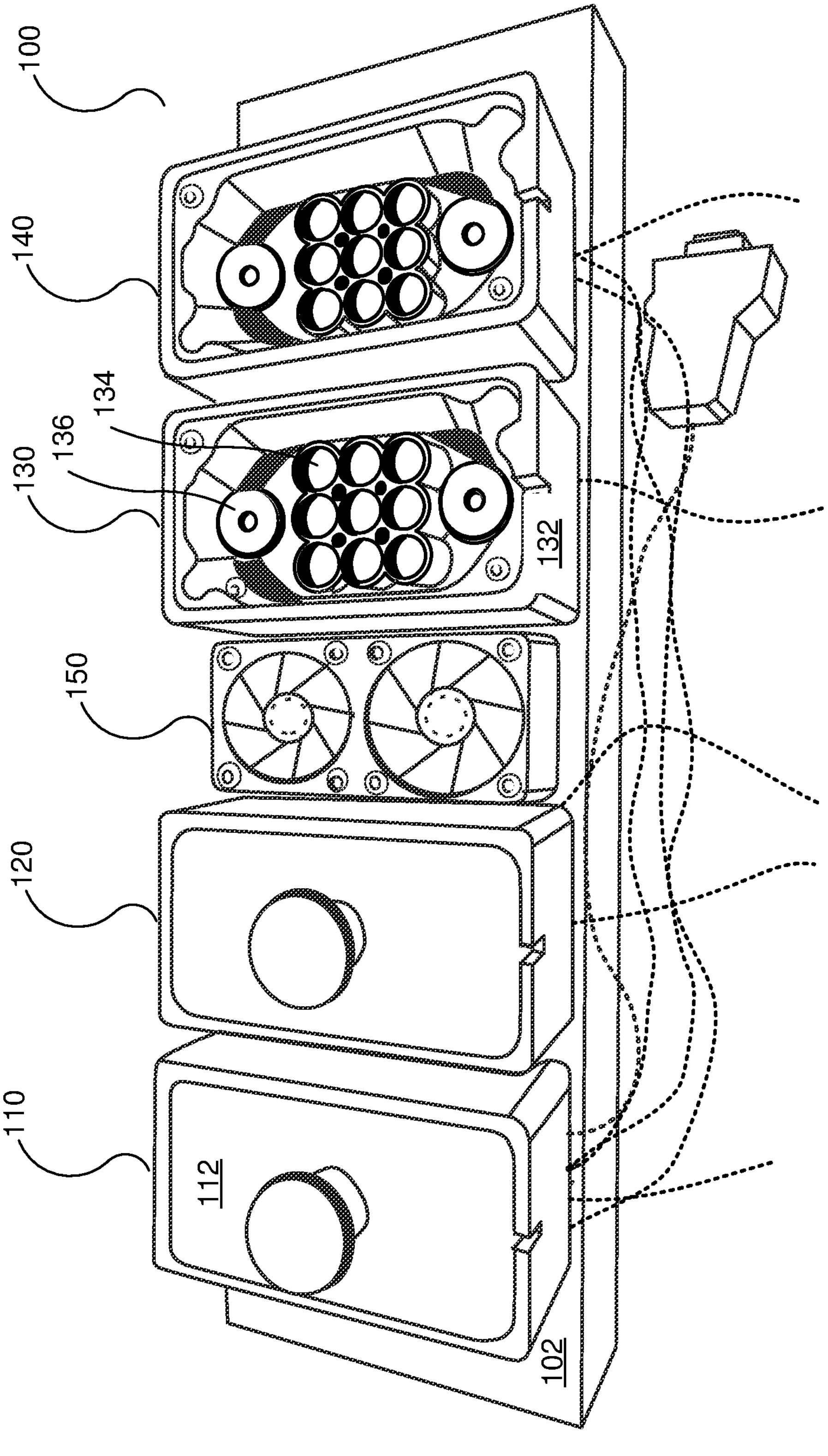
FIG. 1 illustrates an example of a hypergravity thermal payload system in perspective view in accordance with some embodiments.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Hypergravity conditions have been shown to promote the formation of more uniform and pure crystals by facilitating an increase in solute concentration to achieve supersaturation and promote nucleation. On the other hand, microgravity conditions can lead to more perfect crystals with fewer defects due to the absence of gravity-driven convection and buoyancy forces that cause non-uniform crystal growth. Hypergravity and microgravity may be achieved using a centrifuge and/or a space vehicle (manned or unmanned) in space or in transition between Earth and space.

However, the currently available hardware for processing chemical substances is not designed to operate in microgravity, hypergravity, or transition between the Earth and space. Such hardware's architectures, form factors, power requirements, and principles of operation may not be compatible with in-space operations. In particular, the utilization of existing hardware during an in-space operation would give rise to multiple challenges, including but not limited to, the containment of solids and fluids in a zero-gravity environment, effective management of heat dissipation in the vacuum of space, and the enhancement of hardware durability to withstand the stressors of spaceflight, such as vibrations and shock-loads during ascent, and heating, vibrations, and shock-loads during reentry.

Embodiments described herein solve the above-described problem by providing one or more payload systems capable of processing chemical substances and/or pharmaceutical products in microgravity (e.g., during an in-space operation) and/or other conditions during an ascent or reentry phase of a space vehicle. The payload system described herein enables quiescent conditions while ensuring high uniformity mixing and minimizing unwanted chemical and thermal gradients. In some embodiments, the payload system described herein is gravity-agnostic and can function across a range of gravitational conditions, including 1-g, hypergravity, and microgravity. As such, the payload system is not only able to process substances in space but also may perform ground-based tests.

Hypergravity Thermal Payload System

Embodiments described herein include a hypergravity thermal payload system that enables precise thermal control under hypergravity. The payload system is configured to enable melt/cool crystallization on a centrifuge. In particular, the payload is capable of reaching high temperatures for melt, holding the high temperature for extended durations, and rapid cooling. Notably, holding the high temperature for extended durations and rapid cooling is difficult to achieve in a same device. One reason for this is because holding at high temperatures is easier to achieve with low thermal conductance to avoid heat loss, yet high thermal conductance is required to achieve rapid cooling. The payload described herein is the result of extensive thermal modeling, testing, and design to overcome the above-described obstacles, while optimizing for heat management.

In some embodiments, the payload system includes a heaterdevice, a heat spreader (e.g., a copper thermal strap), a heatsink, and fittings. The payload system also includes surface finishes that optimize emissivity to achieve desired thermal radiation. The payload system further includes a convection cover to prevent thermal deviation as a function of rotation speed on the centrifuge. The heater may be a thermoelectric heater, a cartridge heater, a thermal tape, a filament, and/or a heat pipe. In some embodiments, the heat pipe may be used for heating and/or cooling.

In some embodiments, the payload system includes multiple heating zones. Each heating zone's thermal condition can be individually controlled. A heating zone includes a sample plate that can hold one or more sample vials and/or a reference vial. Inside each reference vial, there is a temperature sensor configured to detect the temperature of the heating zone. In some embodiments, packaging and cooling sinks (including a fan) may be adjusted for operation in air (as opposed to vacuum). In some embodiments, a sample plate can hold up to 8 sample vials and a reference vial. In some embodiments, the sample vials include a thermally conductive material. In some embodiments, the sample vials include a thermally non-conductive material. In some embodiments, each sample vial is a polytetrafluoroethylene (PTFE) tube. In some embodiments, the sample vials are PTFE-coated vials. In some embodiments, the PTFE tube or the PTFE-coated vial is not hermetically sealed.

Typical spacecraft devices often use resistive heaters to increase and maintain temperature. Unlike a typical spacecraft device, in some embodiments, the payload system described herein includes a thermoelectric cooler (also referred to as a TEC, Peltier cooler, or PEC). A TEC has a hot side and a cold side. Generally, a TEC is used to rapidly reduce the temperature of the hot side by pumping heat to the cold side, where a heatsink resides. Here, the hot side of the TEC faces the sample plate, and the code side of the TEC faces a heatsink. As such, the hot side is also referred to as the sample plate side or vial side, and the cold side is also referred to as the heatsink side.

The TEC is configured to operate in three different modes. Two of the three modes are atypical for this type of device, and the third mode is a typical mode. In the typical mode, the TEC is used to rapidly reduce the temperature of a hot side by pumping heat to a heatsink side. In a first atypical mode, the TEC operates in reverse at a low current to isolate the hot side of the device from the cold side. Because running the TEC in reverse at low currents reduces passive heat flow from the hot side to the cold side, this increases an overall system heat loss rate, allows more precise temperature control, and enables higher temperature set points. In a second atypical mode, the TEC runs in reverse at a current higher than the first atypical mode to pump heat from the cold side and uses ohmic heating losses in the TEC to further increase the temperature of the hot side. During the second atypical mode, the TEC achieves the following three purposes (1) isolating the hot side from the cold side, (2) transferring heat from the cold side to the hot side, and (3) using resistive losses in the TEC to preferentially heat the hot side of the device.

In some embodiments, control is accomplished via redundant resistive temperature detectors (RTDs) on the hot side (i.e., sample plate side) of the payload system. In some embodiments, the feedback is used to operate in a bang-bang control mode due to limitations on the available compute cycles. The bang-bang control mode causes the TEC to switch between multiple states. In some embodiments, the control mode causes the TEC to switch from a first state to a second state after the TEC is in the first state for a threshold period of time. In some embodiments, a more complex control method may be implemented with a PID (proportional, integral, derivative) controller.

In some embodiments, the temperature of the heatsink side of the payload system is also monitored for the purposes of diagnostic information and/or to enable identification and recovery from failure modes. When the temperature of the heatsink reaches a threshold temperature (also referred to as "a first threshold temperature"), the heatsink becomes too warm to allow for cooling to the desired final temperature. In some embodiments, responsive to determining that the temperature of the heatsink is greater than the threshold temperature, the controller preemptively stops the cooling process of the TEC, allowing the heatsink to cool to a safe hold temperature. After the heatsink cools down to a second threshold temperature (that is lower than the first threshold temperature), the controller restarts the cooling process of the TEC.

FIG. 1 illustrates an example of a hypergravity thermal payload system 100 in perspective view in accordance with some embodiments. The payload system 100 includes a heatsink 102 and four heating zones 110, 120, 130, and 140 coupled with the heatsink 102. One or more fans 150 are placed between heating zones 120 and 130. The fan 150 is configured to cause air to flow through the heatsink, accelerating heat dissipation.

Each heating zone (e.g., heating zone 130) has a sample plate and a convective cover configured to be placed on top of the sample plate to form a thermal chamber. Each sample plate 132 includes one or more heat spreaders 136 in contact with both the sample plate 132 and the heatsink 102, configured to transfer heat from the sample holder 134 to the heatsink 102. The heat spreader 136 is made of a thermally conductive material, such as metal (e.g., copper). In some embodiments, the sample holder 134 is also made of a thermally conductive material. In some embodiments, each sample plate 132 is configured to receive a convective cover 112. The convective cover 112 improves the transfer of heat inside the sample plate. Further, when the hypergravity thermal payload system 100 is placed on a centrifuge, the convective cover 112 also prevents thermal deviation caused by rotation speed variation on the centrifuge. In some embodiments, a sample plate 132 includes multiple sample holders 134. Each sample holder 134 is configured to receive a sample vial or a reference vial.

Figure 2:
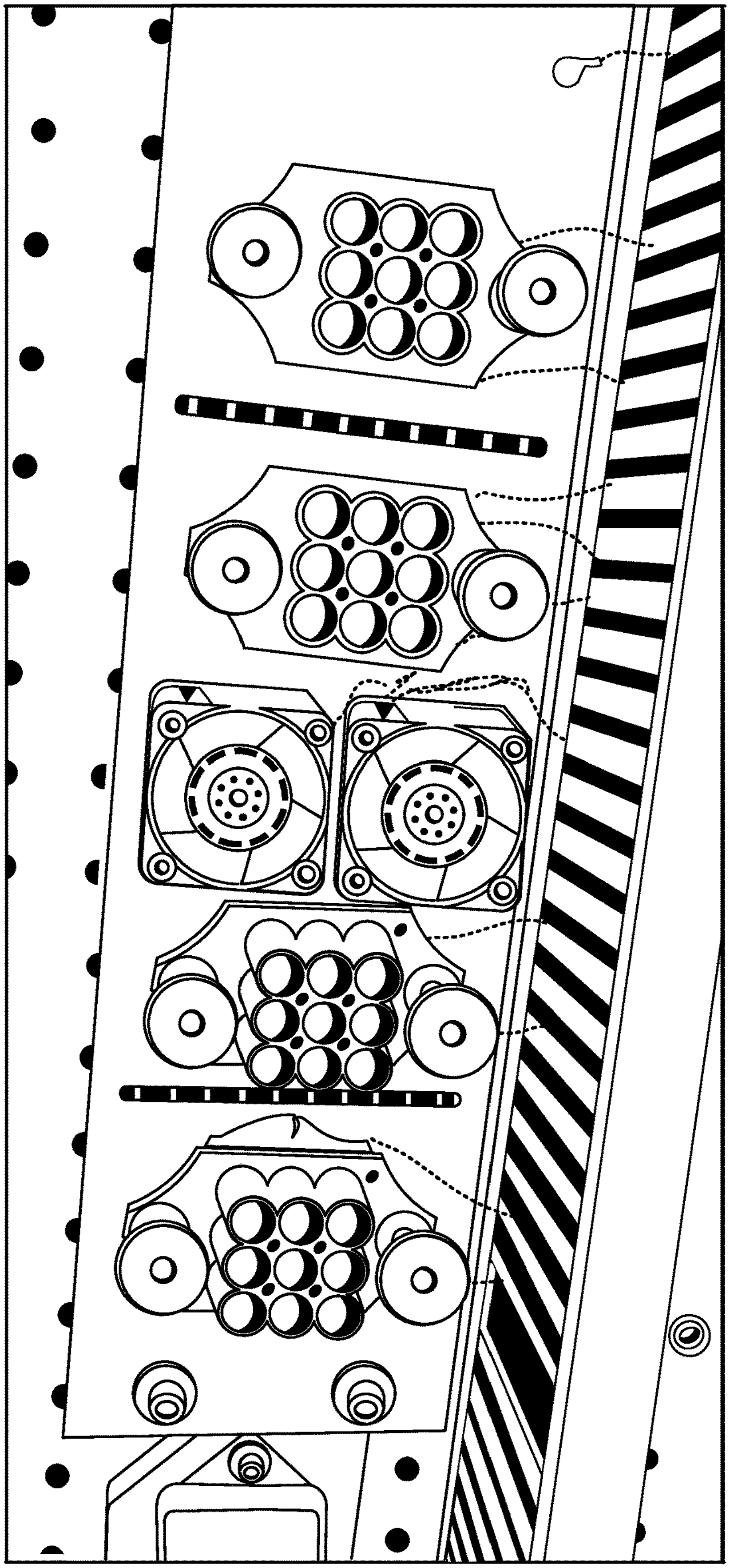
FIG. 2 illustrates that the hypergravity thermal payload system is coupled with a platform, which may be a part of a space vehicle or a centrifuge, in accordance with some embodiments.
Figure 3:
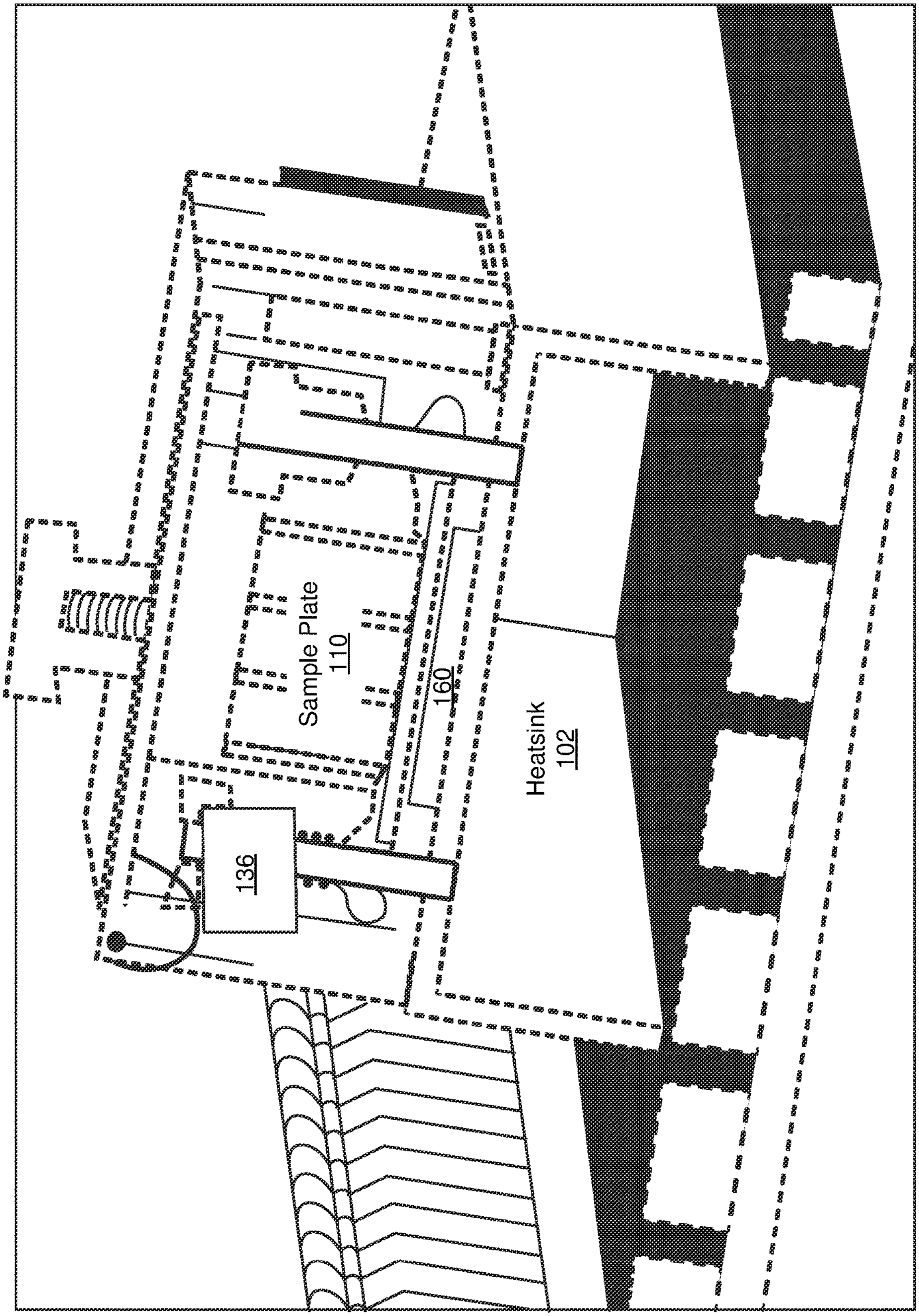
FIG. 3 illustrates a cross-sectional view of the hypergravity thermal payload system in accordance with some embodiments.

FIG. 2 illustrates that the hypergravity thermal payload system 100 is coupled with a platform, which may be a part of a space vehicle or a centrifuge. FIG. 3 illustrates a cross-sectional view of the hypergravity thermal payload system 100. As illustrated, sample plate 132 is coupled with one or more heat spreaders 136, which is in turn coupled with heatsink 102, such that the heat is able to be transmitted from the sample plate 132 to the heatsink 102. In embodiments, a TEC 160 is positioned between each heating zone 110 and heatsink 102, such that each heating zone's temperature can be individually controlled. In embodiments, the hot side of the TEC 160 faces the heating zone 110, and the code side of the TEC faces the heatsink 102.

Note, the TEC 160 in FIG. 2 is merely an example embodiment of heating and cooling. Additional or alternative heating or cooling methods beyond TEC may also be implemented, such as (but not limited to) cartridge heaters, thermal tape, filaments, heat pipes (for cooling and/or heating), or a combination thereof.

Figure 4:
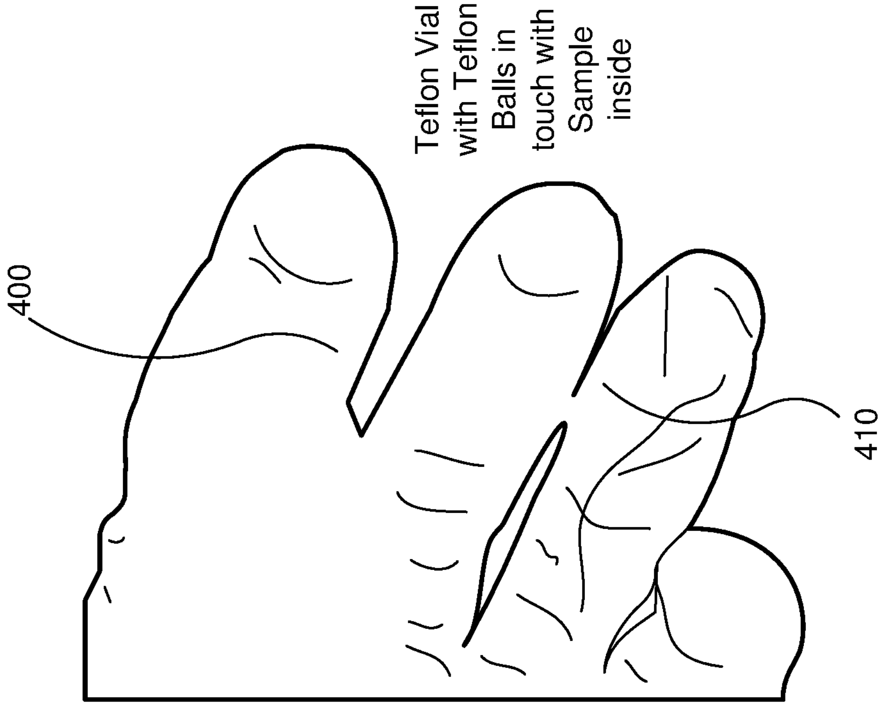
FIG. 4 illustrates a sample vial having one or more PTFE balls placed therein, in accordance with some embodiments.

FIG. 4 illustrates an example of a sample vial 400 that is made of a thermally non-conductive material, in accordance with some embodiments. In some embodiments, there are one or more balls 410 made of a thermally non-conductive material placed in the sample vial 400. In some embodiments, the one or more balls 410 are made of PTFE. In some embodiments, the sample vial is also made of PTFE. The sample vial 400 is configured to hold a sample, and the balls 410 are in touch with the sample.

Note, the sample vial 400 in FIG. 4 is merely an example. In some embodiments, a sample vial may be PTFE coated. In some embodiments, a sample vial may include a thermally conductive material. In some embodiments, sealing of the sample vial uses a mechanism different from the PTFE ball 410 illustrated in FIG. 4. In some embodiments, a sample vial includes a stainless steel liner, and sealing of the sample vial is achieved using a Perfluoroelastomer (FFKM) o-ring inside the stainless steel liner.

Figure 5:
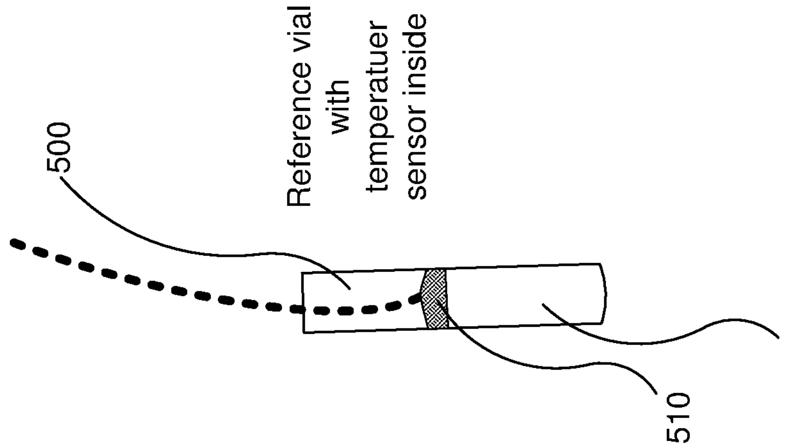
FIG. 5 illustrates a reference vial, in accordance with some embodiments.

FIG. 5 illustrates an example of a reference vial 500, in accordance with some embodiments. The reference vial 500 contains a temperature sensor 510 covered with a material 520 having similar thermodynamic characteristics as the sample contained in the sample vial 400. When the sample vial 400 and the reference vial 500 are both placed in a sample plate 132, the temperature sensor 510 in the reference vial 500 is configured to detect a temperature of the reference vial 500. Because the material 520 contained in the reference vial 500 has similar thermodynamic characteristics as the sample contained in the sample vial 400, the temperature detected by the temperature sensor 510 can be used to estimate the temperature of the sample contained in the sample vial 400.

Gravity-Independent Thermal Payload System

Embodiments described herein also include a gravity-independent thermal payload system that enables precise thermal control in flight (e.g., under microgravity). The melt/cool payload provides operating temperature ranges and enables quenching of chemical substances in space. Quenching is a process of rapid cooling from an elevated temperature in a short time. The payload is able to achieve a challenging thermal profile while operating within the constraints of a spacecraft.

Similar to the hypergravity thermal payload system 100 described above, the gravity-independent thermal payload system includes a thermoelectric heater, a heat spreader (e.g., one or more copper thermal straps), a sized heatsink, and fittings, and surface finishes that optimize emissivity to achieve desired thermal radiation, although the inflight payload system may or may not include a convection cover. In some embodiments, the payload system comprises one or more sample plates, each configured to house one or more vials. In some embodiments, the payload system is able to hold up to 100 sample vials. Each vial is configured to contain powders and melts throughout microgravity processing.

Figure 6B:
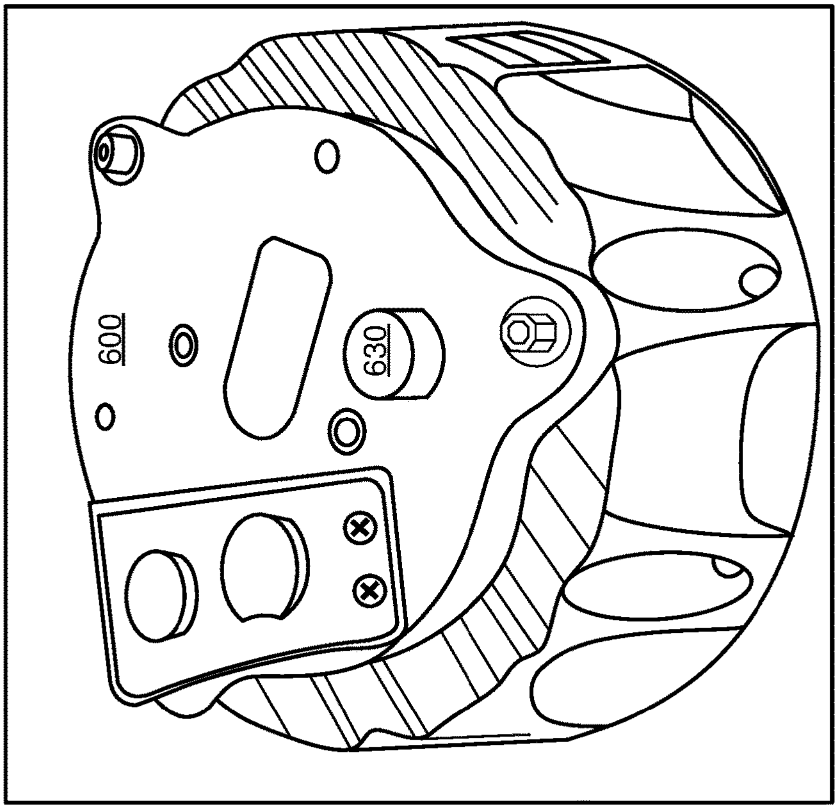
FIG. 6B illustrates a top view of the payload system, in accordance with some embodiments.
Figure 6A:
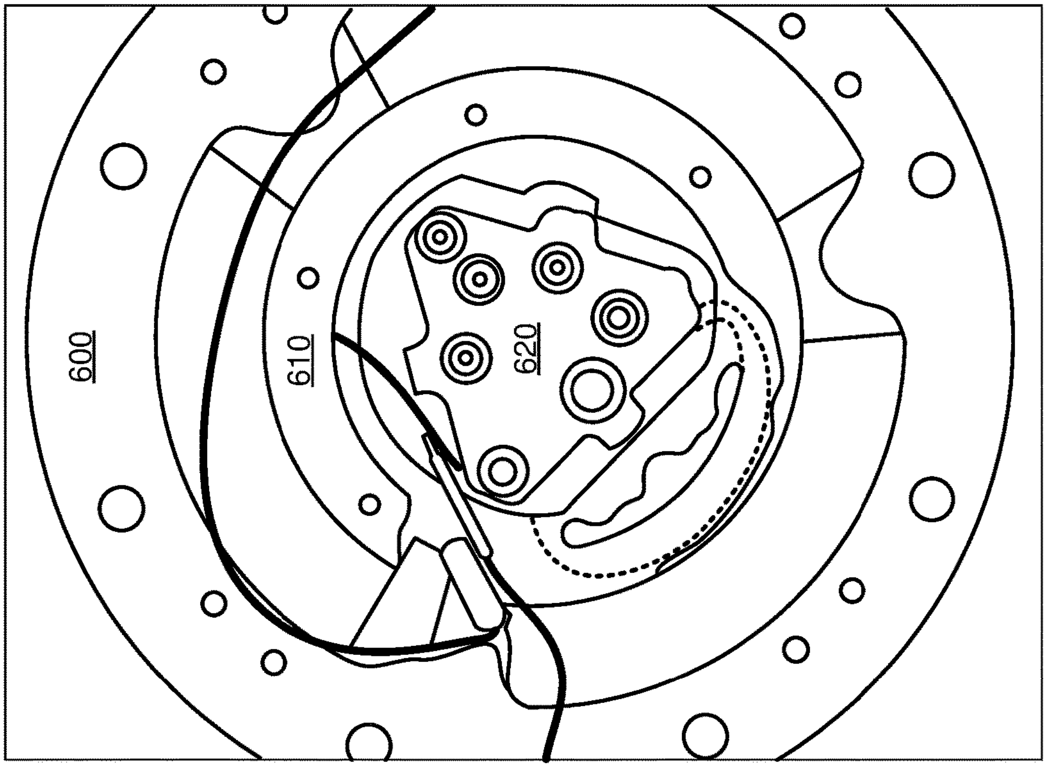
FIG. 6A illustrates a bottom view of a payload system, in accordance with some embodiments.

FIG. 6A illustrates a bottom view of a payload system 600, in accordance with some embodiments. The payload system 600 includes a sample plate 610 and a heat spreader 620 coupled with the sample plate 610. FIG. 6B illustrates a top view of the payload system 600, in accordance with some embodiments. The payload system 600 also includes a vial 630. A TEC (not shown) is sandwiched between the sample plate 610 and the heat spreader 620.

Figure 7:
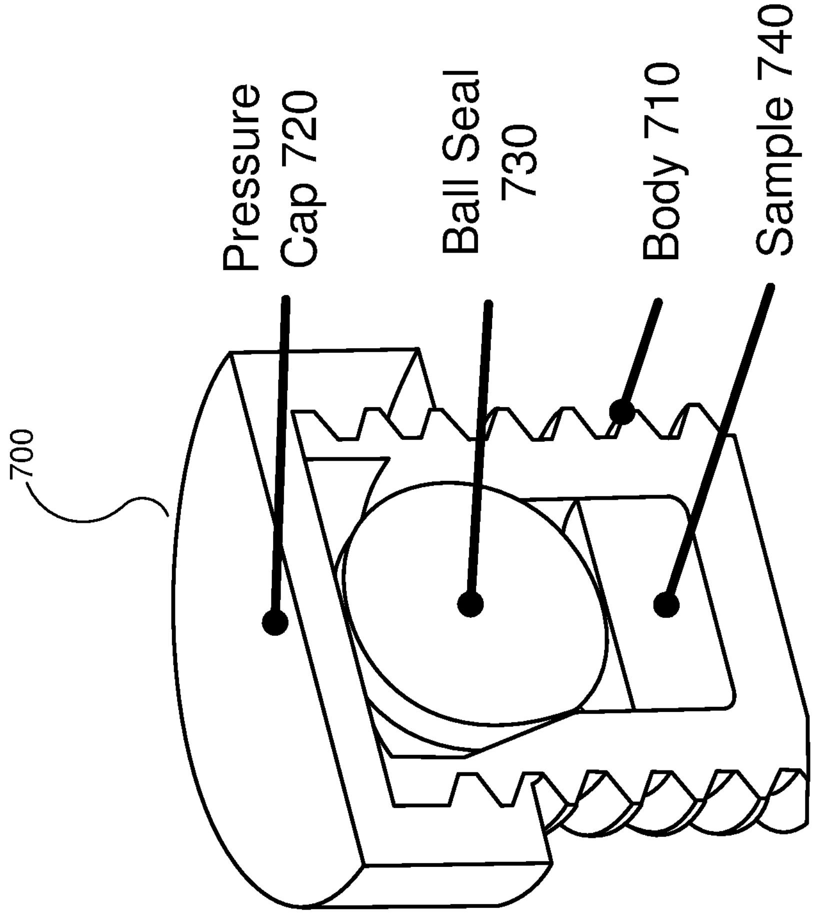
FIG. 7 illustrates a sample vial (which may correspond to the vial shown in FIG. 6B), in accordance with some embodiments.

FIG. 7 illustrates a sample vial 700 (which corresponds to vial 630 of FIG. 6B), in accordance with some embodiments. The vial has a body 710, a pressure cap 720, and a ball seal 730 to keep the sample 740 under compression, and ensure good thermal contact at all times, irrespective of the gravity environment, while keeping the material within the vial hermetically sealed from the environment of space. In some embodiments, an outer surface of the body 710 and an inner surface of the pressure cap 720 are threaded to fit each other. In some embodiments, the ball seal 730 is made of an elastic material to accommodate variations in sample volume that occurs as a result of temperature variations.

In some embodiments, a closed end of the body 710 has a first inner diameter (which is a diameter of an interior surface), and an open end of the body 710 has a second inner diameter that is greater than the first inner diameter. In some embodiments, a first portion of the body 710 of the sample vial at the closed end forms a cylindrical shaped space, and a second portion of the body 710 of the sample vial 700 at the open end forms a truncated cone shaped space, such that an interior of the body gradually opens up toward the open end.

In some embodiments, sample vial 700 is made of a thermally non-conductive material, such as PTFE. In some embodiments, the ball seal 730 is made of a thermally non-conductive material, such as PTFE.

Figure 9:
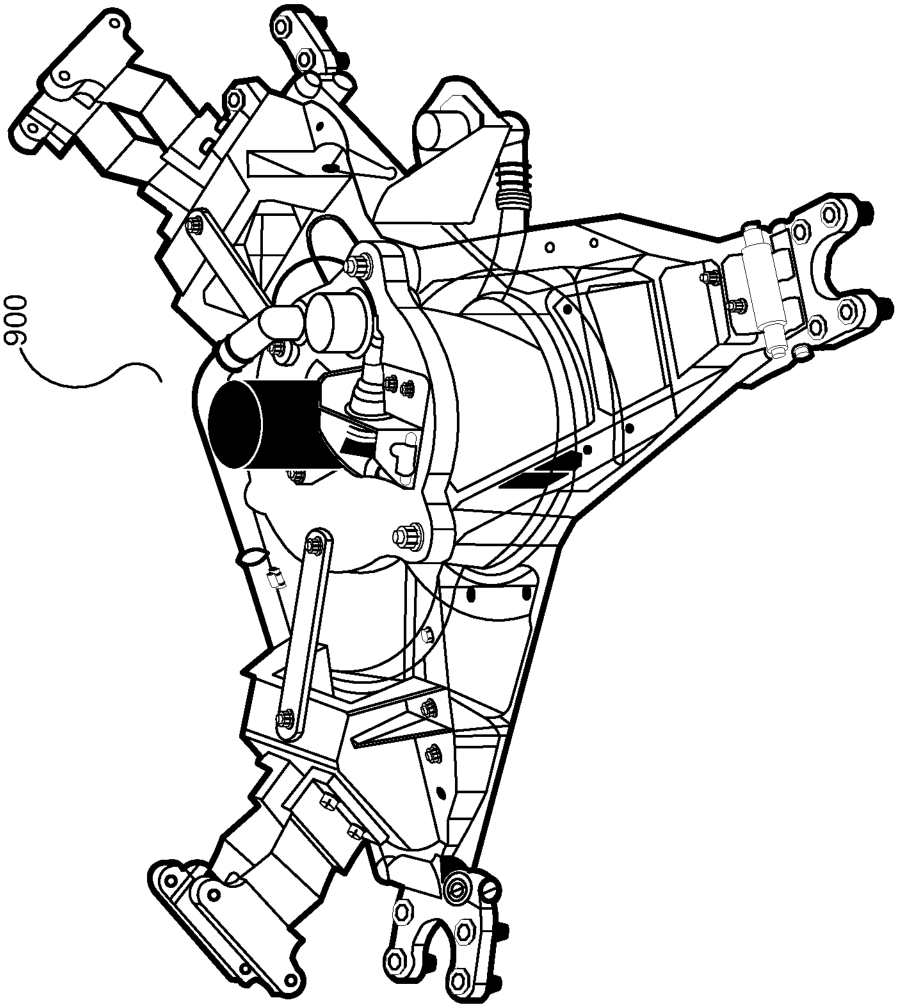
FIG. 9 illustrates an example station configured to be coupled with a space vehicle, in accordance with some embodiments.
Figure 8:
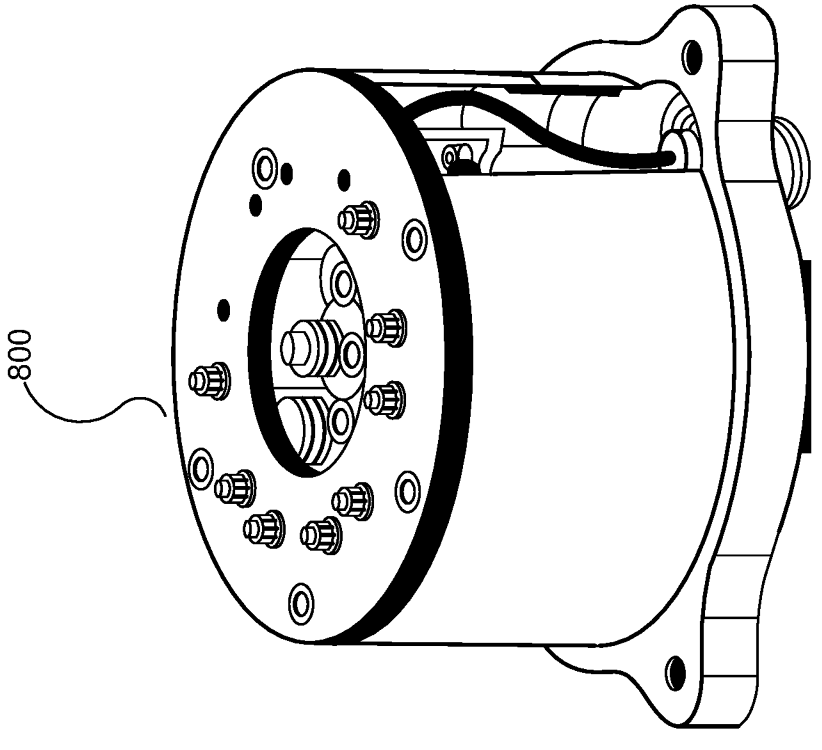
FIG. 8 illustrates an example of a housing configured to house payload system, in accordance with some embodiments.

In some embodiments, the payload system 600 is placed in a housing. In some embodiments, the housing is coupled with a station. The station is attached to a space vehicle. FIG. 8 illustrates an example of a housing 800 configured to house payload system 600. FIG. 9 illustrates an example station 900 configured to be attached to a space vehicle. The example station 900 has a plurality of flexible feet configured to be flexibly attached to a surface of a space vehicle, such that the station 900 is able to flex during vibration and shock on ascent and/or reentry.

In some embodiments, the payload system 600 is detachably coupled with the housing 800. During reentry, the payload system 600 may be detached from housing 800, reducing potential shock and impact over the payload system 600.

In some embodiments, pre-process storage temperature range is between 10-32° C.; the process temperature range is between −10 to 170° C.; the sample volume range of the vial is between 0.1 to 1 mL; and/or heating or cooling minimum speed is between 20° C. per minute (20° C./min) and 70° C. per minute (70° C./min). Generally, a final temperature may be below 30° C. In some embodiments, mission return can achieve a final temperature of less than 0° C. The returned products are solid materials. Many different active pharmaceutical ingredients (APIs) can be supported. In-situ monitoring capabilities may include (but are not limited to) temperature, acceleration, and/or Raman monitoring.

In some embodiments, the payload has a mass of less than 34 lb. Power operation of the payload may be less than 30 Watts (W) during continuous operation, may be less than 70 W during sun pointing, and may be less than 131 W during a manufacturing phase. Total energy consumption may be less than 454 W-hour. In some embodiments, the payload system 600 is designed to be fail-safe. In some embodiments, the payload is demisable during reentry with acceptable casualty risk. In some embodiments, the payload is able to handle shock, random vibe, thermal vacuum environment, and static loads.

Hypergravity Antisolvent Crystallization Payload System

Embodiments described herein also include a hypergravity antisolvent crystallization payload system. Challenges in developing the payload system include controlling the mixing performance independently of the gravity environment. Non-uniform mixing can drive unfavorable broadening of particle size distributions or may even change the resulting crystal structures and particle shapes, negatively impacting product performance. For example, if these changes occur as a function of changing gravity level, it may be unclear whether changes are due to the performance of the mixer, or the effect of gravity on crystallization.

Figure 10:
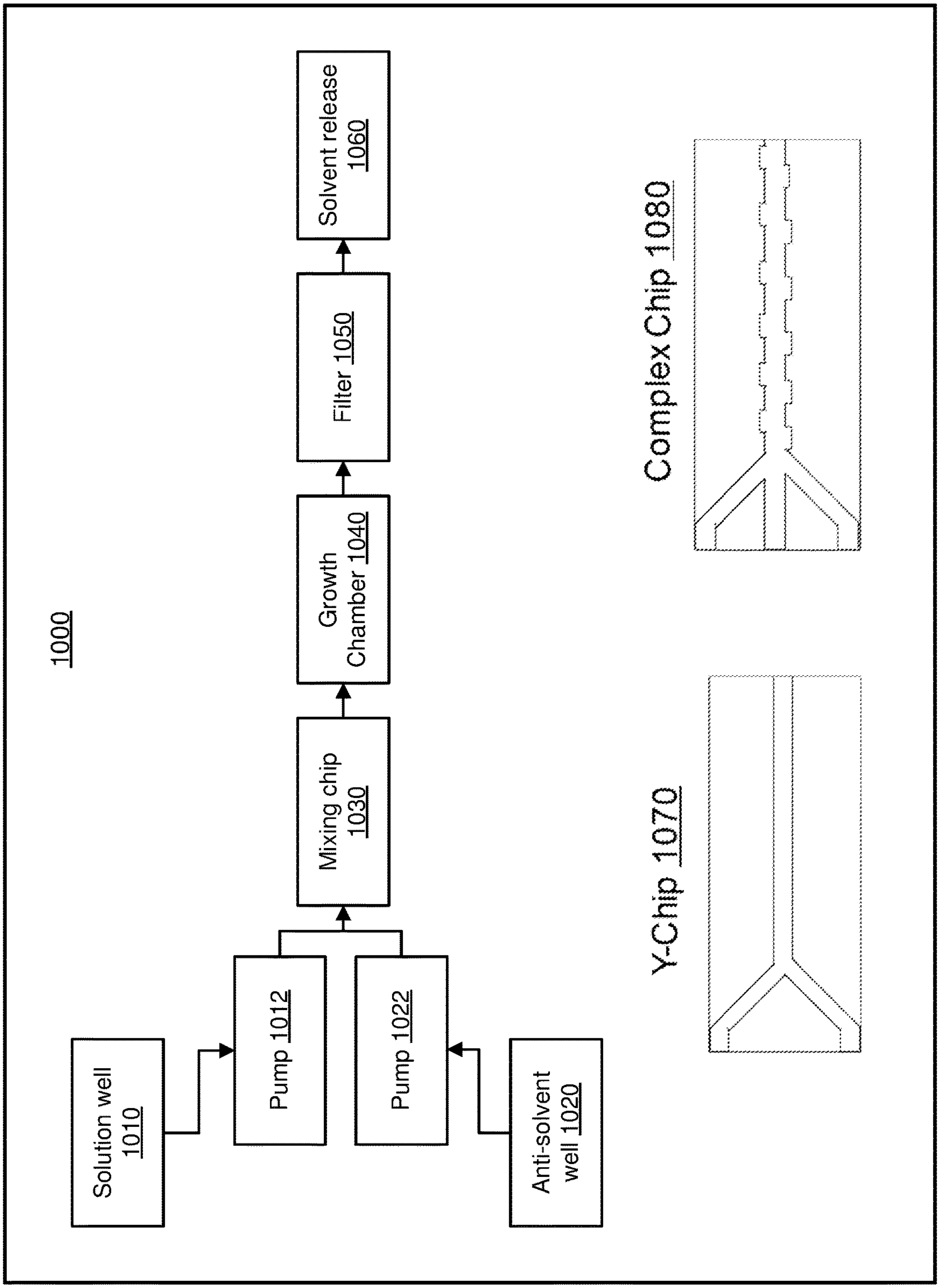
FIG. 10 illustrates an example architecture of a hypergravity antisolvent crystallization payload system, in accordance with some embodiments.

FIG. 10 illustrates an example architecture of a hypergravity antisolvent crystallization payload system 1000, in accordance with some embodiments. The payload system 1000 includes a solution well 1010, an anti-solvent well 1020, and a mixing chip 1030. The payload system 1000 also includes one or more pumps 1012, 1022. In some embodiments, a first pump 1012 is configured to pump a solution from the solution well 1010 to the mixing chip 1030, and a second pump 1022 is configured to pump an anti-solvent from the anti-solvent well 1020 to the mixing chip 1030. In some embodiments, the payload system 1000 also includes one or more valves (not shown) between the solution wells 1010, 1020 and respective pumps 1012, 1022. In some embodiments, the valves and pumps 1012, 1022 are controlled by a controller (not shown).

The mixing chip 1030 is configured to mix the solution and the anti-solvent into a mixture, which enters a growth chamber 1040 where quiescent, unstirred crystallization takes place. The mixture of liquid and solid crystalized chemical substance becomes slurry, which then passes through a filter 1050. The remaining liquid (also referred to as supernatant) is collected at a solvent release 1060. The supernatant may be analyzed and/or recycled later.

In some embodiments, the mixing chip 1030 includes a plurality of inlets, a channel, and an outlet, which are interconnected with each other, allowing fluids to pass through. The inlets are configured to receive an antisolvent and a solvent. The received antisolvent and solvent pass through the channel and exit the channel via the outlet. In the process of passing through the channel, the antisolvent and solvent are fully mixed. The channel may have different geometries and shapes configured to drive mixing independent of convection. In some embodiments, a mixing chip includes a simple Y-channel (e.g., at Y-chip 1070) with a single fluid interface where all mixing is purely diffusive. In some embodiments, more complex geometries (e.g., at complex chip 1080) are implemented to drive controlled fluid motion and promote faster mixing.

In some embodiments, more than 2 streams of liquid are combined and mixed. As illustrated in FIG. 10, the complex chip 1080 includes three inlets, and three streams of liquid may be combined and mixed. In some embodiments, a mixing chip may include more than three inlets configured to combine more streams of liquid. For example, multiple chemicals (e.g., up to five or six chemicals) may be desired for crystallization for different purposes, such as (but not limited to) controlling pH, adding a precipitant, or preventing chemical degradation pathways such as oxidation, or for increasing or decreasing viscosity. Each of the multiple chemicals may need to be separated prior to crystallization to avoid undesired chemical interaction. A mixing chip with multiple inlets may be used to mix the multiple chemicals during crystallization. Note, there is a tradeoff between maximizing channel size for throughput and minimizing channel size to reduce the risk of convective flows. Larger channels reduce the risk of clogging if crystals grow too large and reduce the pressure required to push fluid through due to capillary action, yet smaller channel dimensions ensure purely diffusive transport reducing the risk of convective flows.

Figure 11:
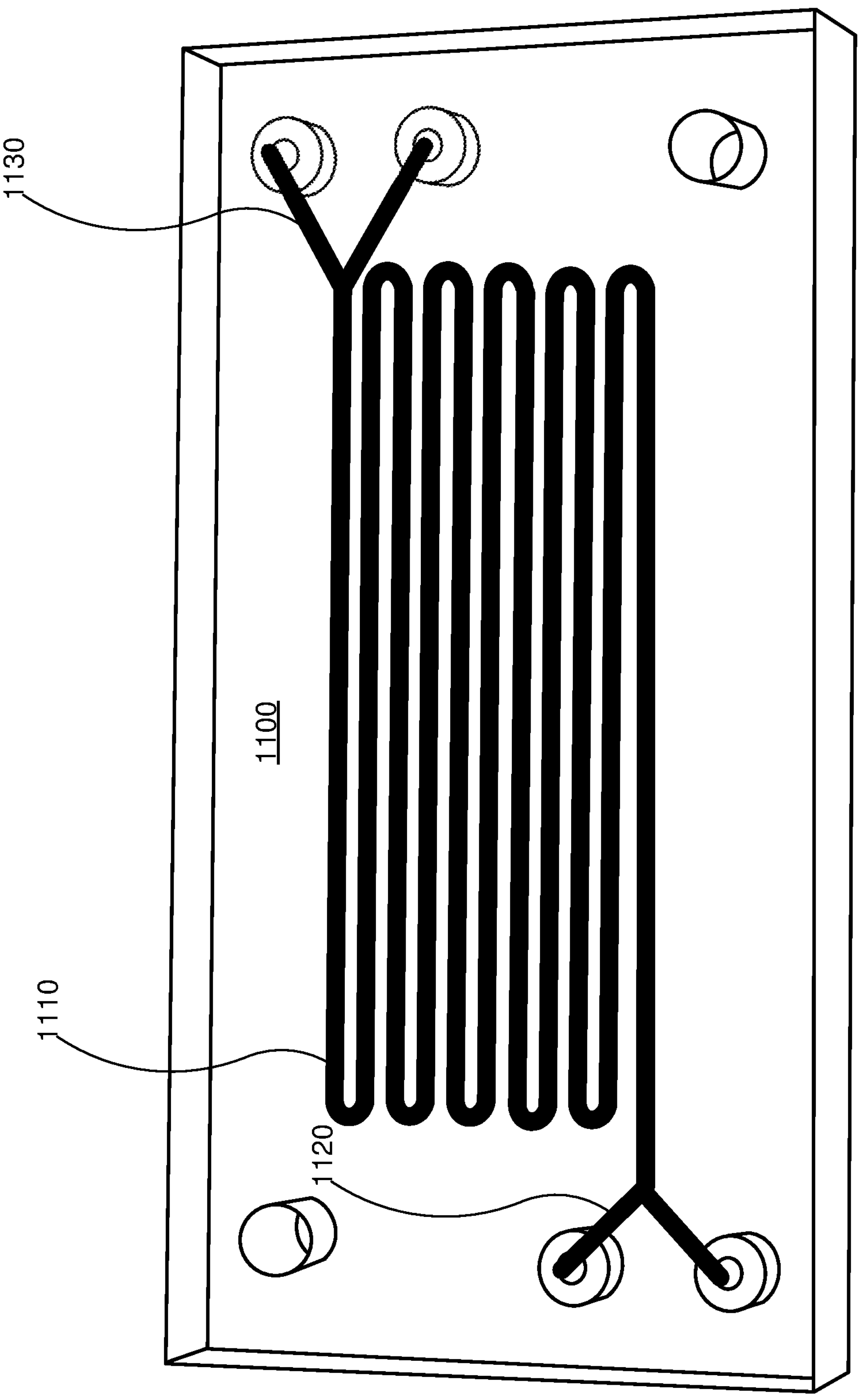
FIG. 11 illustrates an example of a Y-channel mixing chip, in accordance with some embodiments.

FIG. 11 illustrates an example of a Y-channel mixing chip 1100, in accordance with some embodiments. The mixing chip 1100 includes a serpentine channel 1110 with a uniform diameter. There is a Y branch 1120, 1130 on each end of channel 1110. Liquids can be input from either end of channel 1110 and output at the other end of channel 1110.

Figure 12:
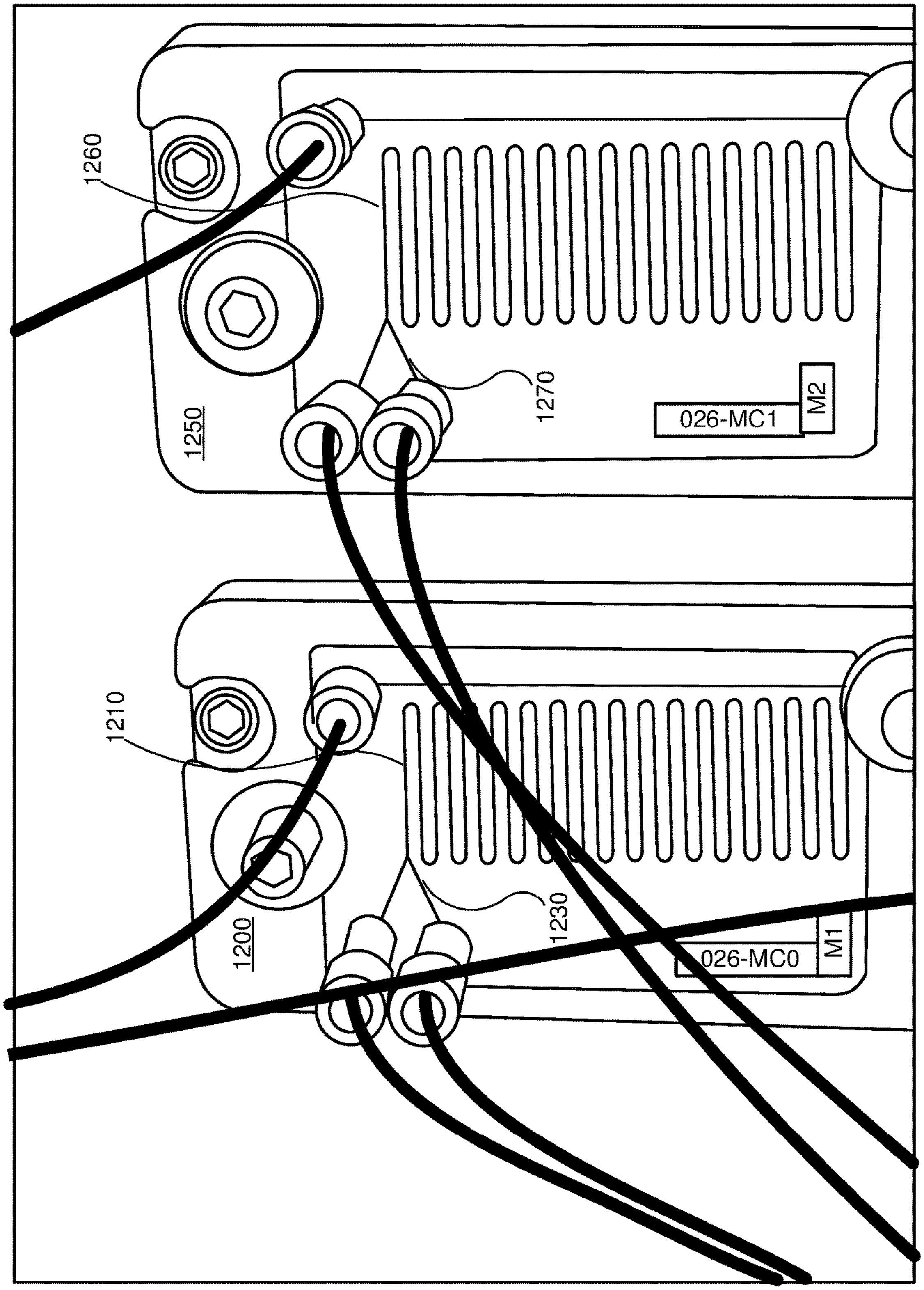
FIG. 12 illustrates another example of a Y-channel mixing chip, in accordance with some embodiments.

FIG. 12 illustrates another example of a Y-channel mixing chip 1200, 1250, in accordance with some embodiments. The mixing chip 1200 or 1250 also includes a serpentine channel 1210, 1260. There is only one Y branch on one end of channel 1210 or 1260. Liquids can be input from the side with the Y branch 1230, 1270 and output at the other end of the channel 1210, 1260.

Turning back to FIG. 10, in some embodiments, the payload system 1000 is configured to perform fluid motion, mixing, and crystal growth under variable gravity, such as between 1 g to 5 g. In some embodiments, the payload system 1000 enables solution-based antisolvent crystallization, cooling crystallization, slurry crystallization, and/or evaporative crystallization. The payload system 1000 is designed to ensure consistent performance over a wide range of effective gravity levels, enabling comparison in performance as a function of gravity.

In some embodiments, the payload system 1000 is gravity-independent, ensuring uniform mixing independent of convection at a large enough scale for producing significant material.

In some embodiments, the payload system 1000 includes more than one growth chamber. In some embodiments, the payload system includes 12 growth chambers of 20 mL. In some embodiments, the payload system includes a tuning mechanism that allows an antisolvent ratio to be tunable between 0 and 1. In some embodiments, the payload system 1000 is configured to operate at room temperature. Alternatively, or in addition, the payload system may incorporate thermal control. For example, it may be desirable to heat both the growth chamber and the mixing chip to the same temperature to avoid any undesired changes in supersaturation due to temperature differences. In some embodiments, thermal control may be achieved by a TEC and a heatsink, similar to the payload system described with respect to FIGS. 6A, 6B, and 7-9. In some embodiments, a convective cover may also be used to achieve thermal control, similar to the payload system described with respect to FIGS. 1-5.

In some embodiments, the payload system also includes one or more in-situ analytical sensors for infrared spectroscopy, Raman spectroscopy, turbidity sensing, optical imaging, and video microscopy. These sensors can provide information about the crystallization process that can be used to trigger endpoints or drive feedback control to over supersaturation or other relevant process control parameters. In some embodiments, the sensors may also interface with the mixing chip, with flow cells in between the major subsystems of the hardware, or directly with the growth chambers and/or filters.

Figure 13A:
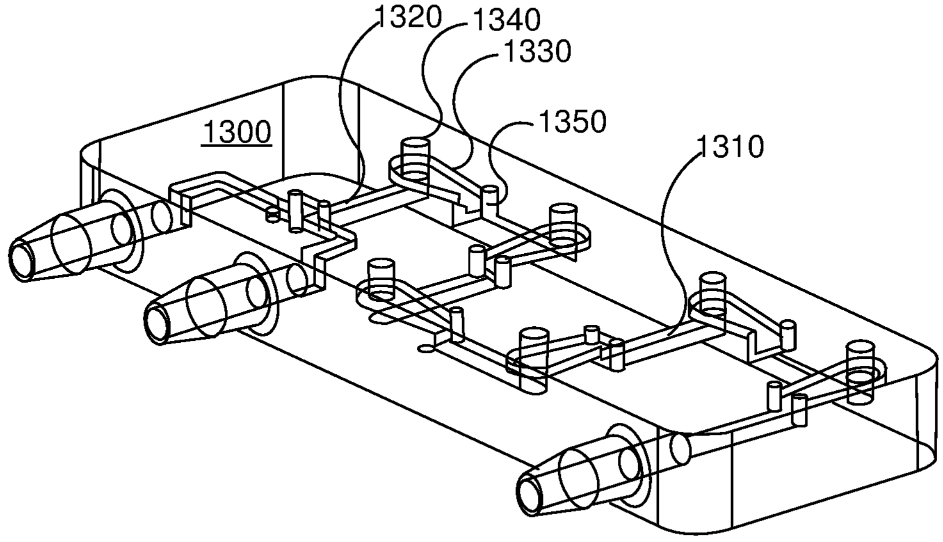
FIGS. 13A and 13B illustrate an example of mixing chip with more complex geometries, in accordance with some embodiments.
Figure 13B:
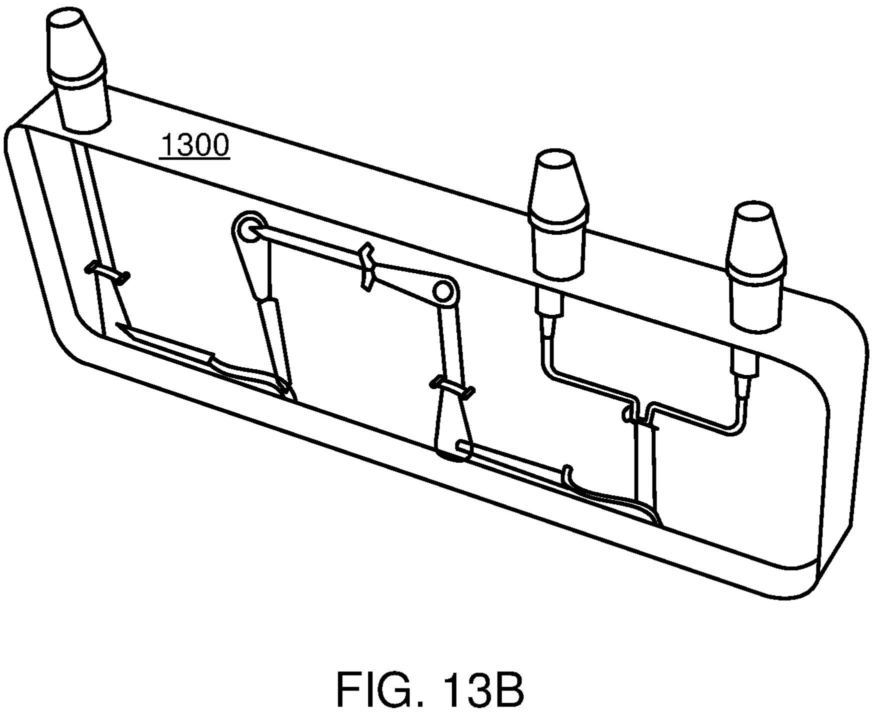

FIGS. 13A and 13B illustrate an example of mixing chip 1300 with more complex geometries, in accordance with some embodiments. Mixing chip 1300 comprises a channel 1310 with varying diameters. Within channel 1310, multiple segments (e.g., portions 1320, 1330) are interconnected through several joints (e.g., 1340, 1350). Each segment can possess a diverse geometric shape, ranging from regular to irregular forms. The cross-sectional area or diameter of each segment may or may not exhibit uniformity. In certain embodiments, the cross-section of a segment may progressively change, either increasing or decreasing. The joints connecting the segments may or may not lie within the same plane. These joints can adopt different geometric shapes, including regular or irregular forms. In some embodiments, the diameter of a joint may progressively change, either increasing or decreasing.

Figure 14:
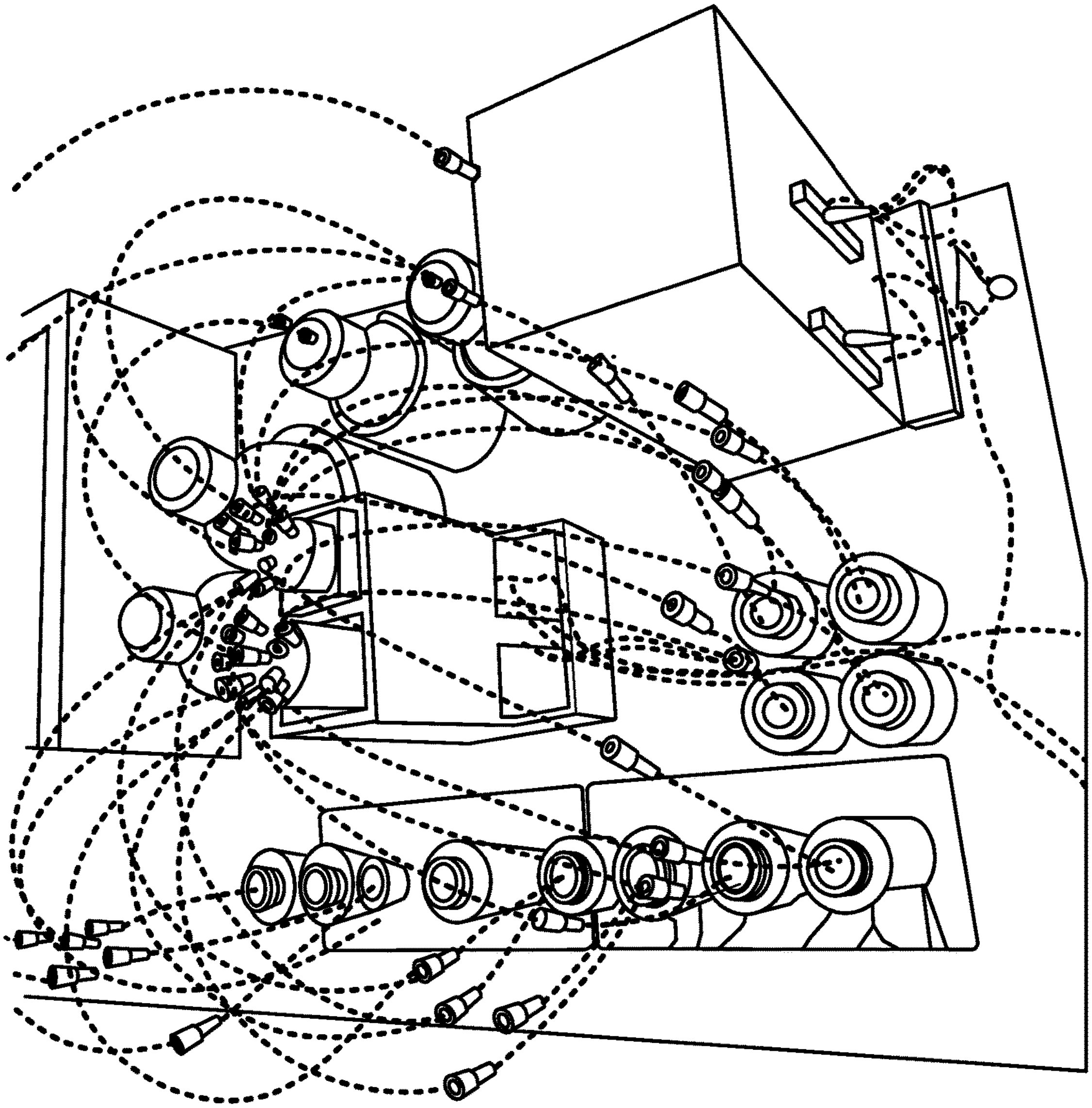
FIG. 14 illustrates an example embodiment of liquid containers coupled to pumps, which are parts of the payload system, in accordance with some embodiments.

FIG. 14 illustrates an example embodiment of liquid containers coupled to pumps, which are parts of the payload system. The liquid containers are interconnected with each other via tubes. Each of the liquid containers may be a solution well or an anti-solvent well configured to hold a solution or an anti-solvent. In some embodiments, some of the solution wells and/or anti-solvent wells are placed on a thermal-controlled platform. In some embodiments, thermal control may be achieved by a TEC and a heatsink, similar to the payload system described with respect to FIGS. 1-5, 6A, 6B, and 7-9. In some embodiments, a convective cover may also be used to achieve thermal control, similar to the payload system described with respect to FIGS. 1-5.

Figure 15:
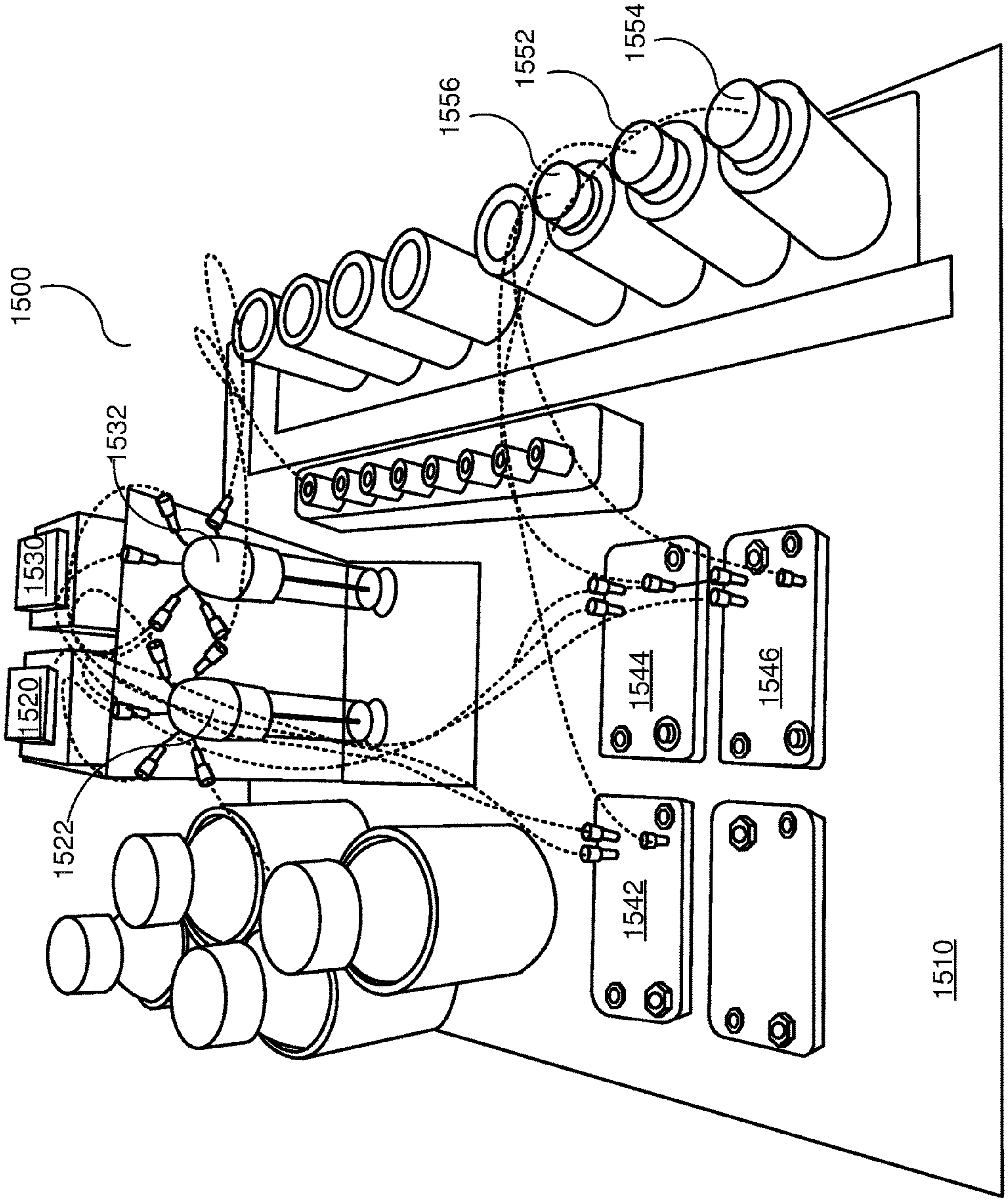
FIG. 15 illustrates an example embodiment of a payload system, which corresponds to the architecture of the payload system of FIG. 10, in accordance with some embodiments.

FIG. 15 illustrates an example embodiment of a payload system 1500, which corresponds to the architecture of the payload system 1000 of FIG. 10. The payload system 1500 includes a platform 1510, a solution well 1520 containing a solution, an anti-solvent well 1530 containing an anti-solvent, and multiple mixing chips 1542, 1544, 1546. The solution well 1520 is coupled with a first pump 1522 configured to pump the solution from the solution well 1520 to the mixing chips 1542, 1544, 1546, and the anti-solvent well 1530 is coupled with a second pump 1532 configured to pump the solution from the anti-solvent well 1530 to the mixing chips 1542, 1544, 1546.

The mixing chip 1542, 1544, 1546 may correspond to the mixing chip 1200, 1250, or 1300 of FIG. 12, 13A, and 13B, each of which includes two inlets and an outlet connected by a channel. One of the two inlets receives the solution from the solution well 1520, and the other receives the anti-solvent from the anti-solvent well 1530. The solution and the anti-solvent are mixed in the process of passing through the channels of the mixing chips 1542, 1544, 1546. The mixture of the solution and the anti-solvent exits the outlet of the mixing chip to be deposited in a respective growth chamber 1552, 1554, 1556. Similar to the solution wells and anti-solvent wells illustrated in FIG. 14, the growth chambers 1552, 1554, 1556 may also be placed on a thermal-controlled platform. In some embodiments, thermal control may be achieved by a TEC and a heatsink, similar to the payload system described with respect to FIGS. 6A, 6B, and 6-9. In some embodiments, a convective cover may also be used to achieve thermal control, similar to the payload system described with respect to FIGS. 1-5.

Gravity-Independent Antisolvent Crystallization Payload System

Embodiments described herein also include a gravity-independent antisolvent payload system that enables anti-solvent crystallization in flight (e.g., under microgravity). The payload system is a compact set of solution-based crystallization hardware designed to conform to the constraints of a spacecraft, such as power, mass, thermal budget, and mechanical requirements. In addition to addressing the gravity-independent mixing challenge, it shares with the hypergravity hardware, this payload system also addresses thermal management constraints and embodies geometries, sizes, and surface coatings that enable operating within a desired thermal profile (similar to constraints faced by the melt/cool payload described above with respect to FIGS. 6A, 6B, and 7-9).

Figure 16:
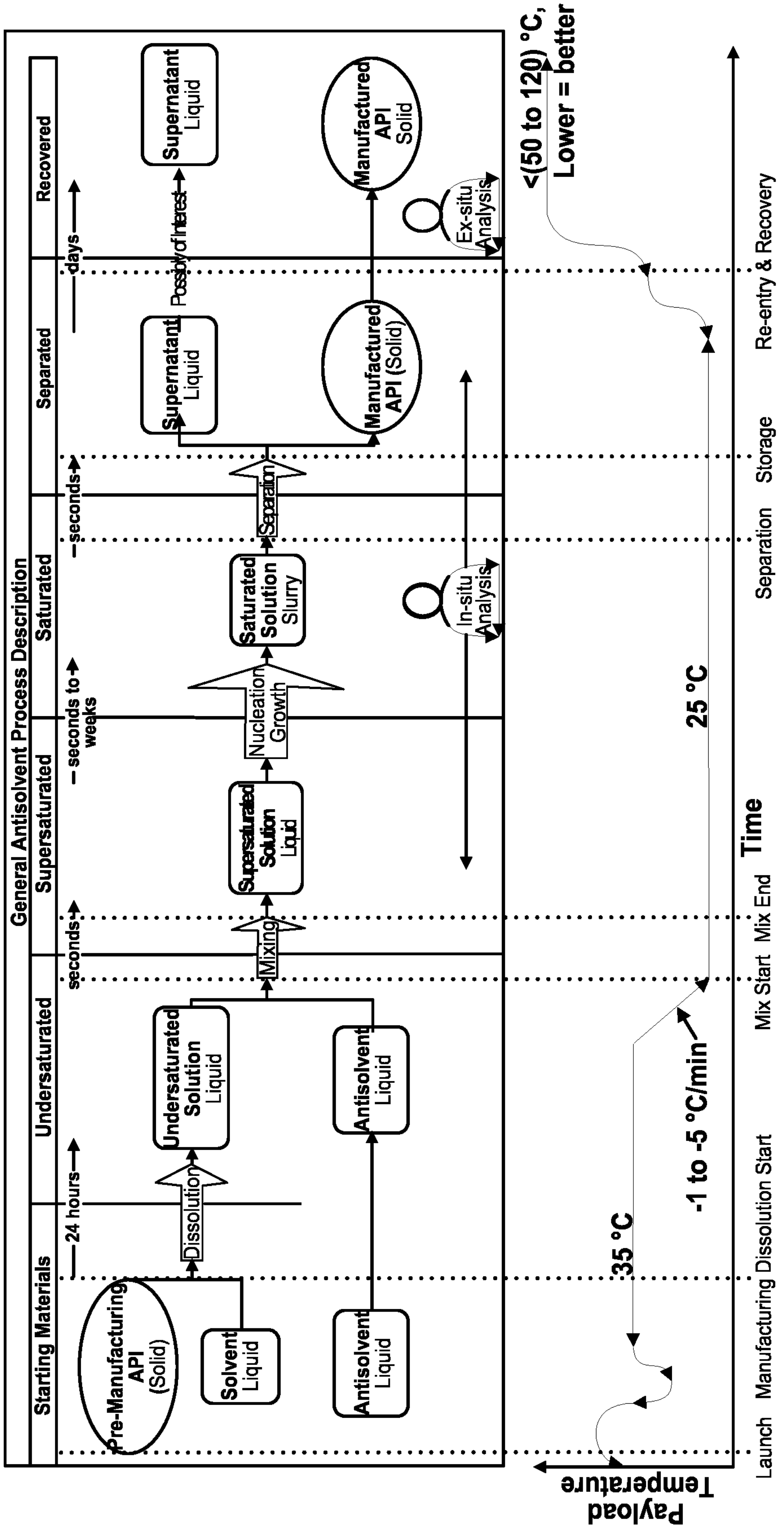
FIG. 16 illustrates an example of an antisolvent process performed by the flight antisolvent payload system, in accordance with some embodiments.

FIG. 16 illustrates an example of an antisolvent process 1600 performed by the flight antisolvent payload system, in accordance with some embodiments. The antisolvent process 1600 starts with a solid chemical substance (also referred to as "pre-manufacturing chemical substance," "pre-manufacturing active pharmaceutical ingredient," or "pre-manufacturing API"), a solvent liquid, and an antisolvent liquid. The solid chemical substance and the solvent liquid are mixed to cause the chemical substance to be dissolved in the solvent liquid to produce an undersaturated solution liquid. The dissolution process may take about several hours, such as 24 hours, to complete. The payload temperature for the dissolution process may be around 35° C. In some embodiments, at the launching of a space vehicle, the pre-manufacturing API (in solid form) and the solvent liquid are stored separately. After launching, when the space vehicle reaches a certain height, or when gravity level reaches a microgravity level, the dissolution process is started.

The undersaturated solution liquid and the antisolvent liquid are then mixed together to produce a supersaturated solution liquid. Before the mixing process, the payload temperature rapidly reduces, for example from about 35° C. to about 25° C. at a cooling speed between −1° C. to −5° C. per minute. After the temperature reduction, the mixing process may take a few seconds to complete.

The supersaturated solution liquid then goes through a nucleation growth process to produce a saturated solution slurry at the payload temperature, for example of about 25° C. The nucleation growth process may take from a few seconds to a few weeks to complete.

The saturated solution slurry then goes through a separation process, which separates the solid chemical substance (also referred to as "manufactured chemical substance" or "manufactured API") from the liquid at the payload temperature of about 25° C. The separation process may take a few seconds. The resulting liquid from the separation process is called supernatant. In some embodiments, one or more in-situ analytical sensors may be implemented for infrared spectroscopy, Raman spectroscopy, turbidity sensing, optical imaging, and video microscopy. These sensors can provide information about the crystallization process that can be used to trigger endpoints or drive feedback control to over supersaturation or other relevant process control parameters.

The supernatant and manufactured API are eventually recovered. In some embodiments, the payload temperature for the recovery process may be increased to a temperature between 50 and 120° C. during the recovery process. In some embodiments, lower payload temperatures improve the recovery process. In some embodiments, one or more ex-situ analytical sensors may be implemented to provide information about the recovery process. The separation and recovery process may take several days to complete. In some embodiments, the recovery process is performed when the space vehicle is reentering into an atmosphere of Earth.

In some embodiments, the antisolvent and solution are premixed and loaded directly into a growth chamber, and temperature is used to trigger crystallization. For example, in some embodiments, the mixture may be stored at a temperature between −25 and −15° C. (e.g., −20° C.), and later thawed in hypergravity or microgravity. The thawed mixture may then be heated to ensure complete dissolution of the components, and then cooled to drive crystallization.

Figure 17:
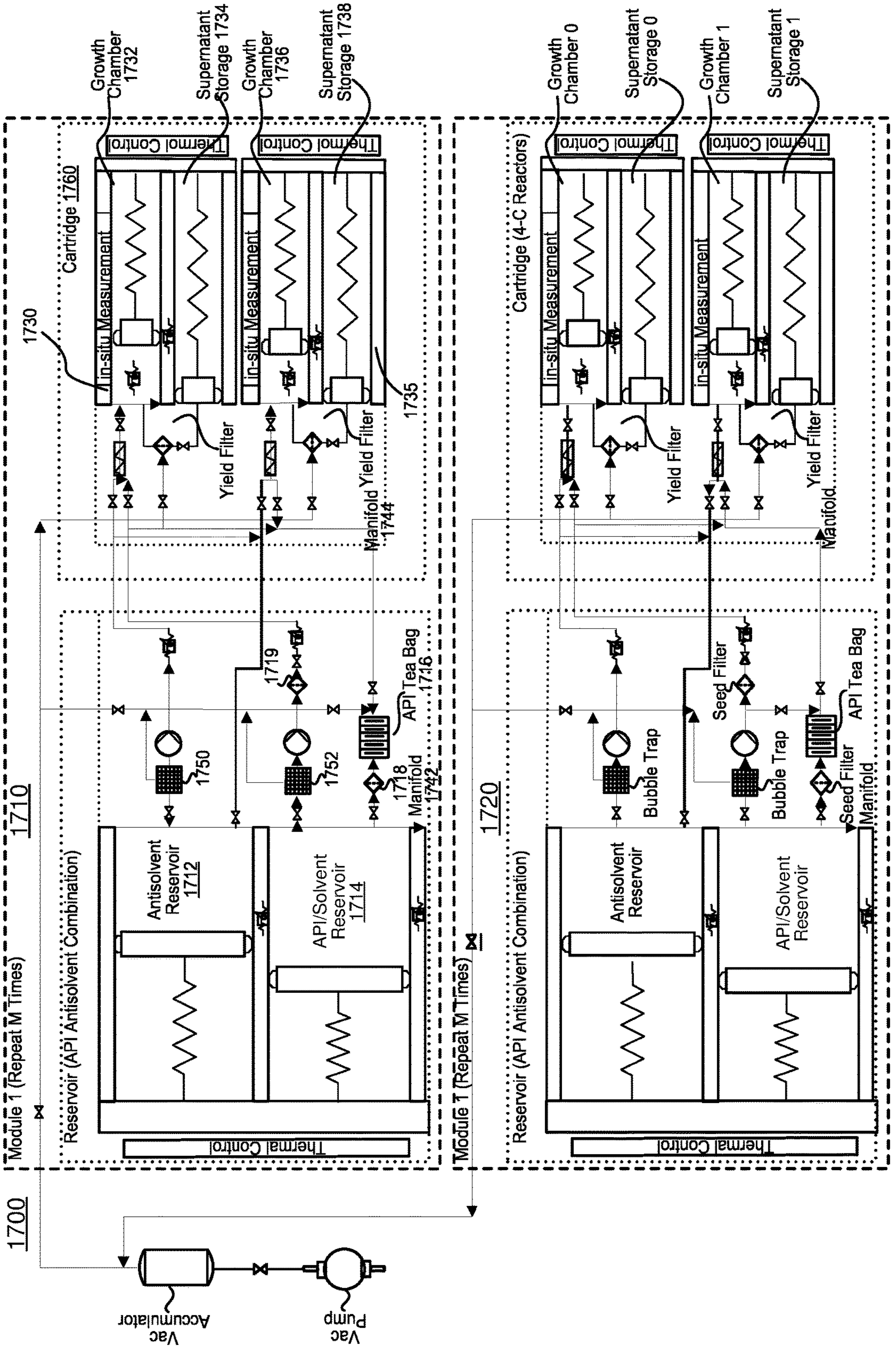
FIG. 17 illustrates an example architecture of a portion of a flight antisolvent payload system, in accordance with some embodiments.

FIG. 17 illustrates an example architecture of a portion of a flight antisolvent crystallization payload system 1700, in accordance with some embodiments. In some embodiments, the payload system 1700 includes one or more identical antisolvent crystallization modules 1710, 1720. In some embodiments, the module 1710 or 1720 may repeat a number of times in the payload system.

In embodiments, the components of payload system 1700 are hermetically sealed in a pressurized box to enable heat transfer and thermal management in a gas environment as opposed to the vacuum of space. This can be augmented with a fan or gas pumping system to encourage convective cooling external to the sealed fluid system to ease thermal management challenges.

As illustrated, the antisolvent module 1710 includes a first reservoir 1712 (also referred to as an antisolvent reservoir) and a second reservoir 1714 (also referred to as an API/Solvent reservoir). The first reservoir 1712 stores an anti-solvent liquid. The second reservoir 1714 stores unsaturated solution liquid produced by dissolving pre-manufacturing solid API in the solution liquid. The pre-manufacturing solid API is contained in an API tea bag 1716. The solvent solution circulates through the API tea bag 1716 to cause the API to be dissolved in the solution to produce the unsaturated solution liquid (which is stored in the second reservoir 1714). In-situ dissolution is incorporated to prevent chemical degradation of drug substances in solution prior to crystallization. In embodiments, the API powder is loaded into an API plug (e.g., such as an API tea bag) after the space vehicle reaches a threshold height, or gravity level reaches a certain microgravity level. The solvent liquid recirculates through the plug until the API powder is fully dissolved. In some embodiments, a mechanical shaker is coupled with the plug to enhance the dissolution of the solid API powder.

The unsaturated solution liquid and the antisolvent are further processed by one or more manifolds 1742, 1744, mixing the unsaturated solution liquid and antisolvent into a mixture liquid. In some embodiments, the fluid manifolds 1742, 1744 comprise multiple subtractively manufactured plates (typically plastic). In some embodiments, the multiple subtractively manufactured plates are diffusion bonded into a single piece to achieve a closed volume with complex geometry. The manifolds may be connected using custom-designed fluid coupling plugs that allow for easy assembly while maintaining a leak-free seal.

The mixture liquid processed by the one or more manifolds 1742, 1744 is then received by one or more growth chambers 1732, 1736. In some embodiments, a first seed filter 1718 is used to prevent clogging of the recirculatory, and a second seed filter 1719 at the outlet prevents any residual crystals from entering growth chamber 1732, 1736.

The module 1710 also includes microgravity-compatible bubble traps 1750, 1752 in line with the fluid flow pathways to allow for removal of bubbles at all scales. For example, a first bubble trap 1750 is placed in the fluid flow pathway of the antisolvent reservoir 1712; a second bubble trap 1752 is placed in the fluid flow pathway of the API/solvent reservoir 1714. These bubble traps 1750, 1752 incorporate a gas-permeable but not liquid-permeable membrane with a vacuum on one side and a thin layer of fluid on the other. In some embodiments, a thickness of the layer of fluid (also referred to as a "liquid film") is no greater than a threshold. By restricting the maximum thickness of the liquid film over the membrane, the payload can result in that gas bubbles larger in diameter than the film's thickness will be removed due to the pressure difference across the membrane. This is advantageous for several reasons, including (1) bubbles prevent accurate dispensing of precise amounts of each fluid component per the desired chemical process, (2) it is difficult or impossible to load the fluids into a closed volume without introducing some trapped gas; (3) dead volumes in the payload will be filled with gas, and cannot be vented to vacuum prior to fluid pumping since this would cause unpredictable fluid vaporization/cavitation during the process, and (4) enclosed gases can cause temperature/surface tension driven convective flows during crystal growth, which would disturb the ultra-low convection conditions achieved via microgravity.

The antisolvent crystallization module 1710 also includes a cartridge 1760 having one or more reactors for mixing the undersaturated solution liquid with the antisolvent liquid. As illustrated, the cartridge includes (1) a first in-situ reactor 1730 having a first growth chamber 1732 and a first supernatant storage 1734, and (2) a second in-situ reactor 1735 having a second growth chamber 1736 and a second supernatant storage 1738.

In some embodiments, each growth chamber includes plungers and springs or other mechanisms to push the fluid through a yield filter to capture the crystals. This step removes the solvent from the crystals (for example, <% 5 solvent by weight) at defined endpoints. This step also prevents any crystal forms that are crystalized in microgravity from undergoing additional physical or chemical changes after the process is complete, and prior to recovery on the ground.

In some embodiments, adjacent to the growth chamber, an additional plunger volume is implemented to collect the remaining solution post filtration (filtrate) after isolation. The recovery of this material will enable further insight into the crystal formation process and effects of microgravity.

In some embodiments, post filtration, an additional valve pathway is implemented to allow for partial or complete drying with exposure to a vacuum line (which may be a hard space vacuum or internally pumped light vacuum) connected to the growth chamber opposite the filter used to isolate formed crystals. If partially dried, a slurry may be isolated. Such embodiments enable further process steps including slurry mediated crystal transformation or growth or formation of solvates. If exposed to a vacuum before all solvent is removed, this could enable an alternative process for evaporative crystallization.

In some embodiments, the payload system 1700 uses electromechanically actuated pumps to accomplish fluid movement. Alternatively, a combination of passive spring plungers with staged stiffness (hydro locked during the launch phase) or pneumatically driven plungers may be implemented.

In some embodiments, the payload may utilize the turbulence induced by transferring back and forth between two syringes separated by a narrow restriction (valve) to accomplish mixing of two components or dissolution of the dry loaded powder in a solvent.

In some embodiments, a first thermal control system is implemented at the first and second reservoir 1712, 1714 configured to control temperature of the first and second reservoir 1712, 1714. In some embodiments, a second thermal control system is implemented at each reactor 1730, 1735 configured to control temperature of the growth chamber and supernatant storage of the corresponding reactor 1730, 1735.

In some embodiments, thermal control is accomplished via a collection of either solid metal conductors or heat pipes, which are connected to a cold side attached to the spacecraft. In some embodiments, further independent thermal control of various regions is accomplished with a combination of thermoelectric coolers (TECs) and resistive heaters, which are controlled electronically using feedback from a number of temperature sensors on each device.

In some embodiments, initial crystal nucleation is monitored using a custom-designed turbidity sensor which leverages one or more LEDs, photodiodes, time of flight sensors, and smoke detector ICs to detect the cloudiness of the fluid solution. This feature is used to determine the onset of nucleation since this phenomenon may differ unpredictably from nucleation onset in a 1-g setting. Without this feature, it would be difficult to know for certain the duration of the growth time following nucleation.

In some embodiments, the payload system described herein incorporates a set of modular subassemblies that allow for convenient reconfiguration to accommodate different numbers of solvents, active pharmaceutical ingredient (API) powders, number of growth chambers, etc. In some embodiments, each module is assembled with a separate electro-mechanical package integrating control electronics, fluid systems, mechanical hardware, and thermal control interfaces/sensors/devices in a single unit testable package.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of symbolic representations of operations on devices. These descriptions and representations are commonly used by those skilled in the arts to convey the substance of their work effectively to others skilled in the art. These operations, while described functionally, computationally, or logically, are understood to be implemented by well-known components. Furthermore, it has also proven convenient at times, to refer to these arrangements of operations as modules, without loss of generality. The described operations and their associated modules may be embodied in hardware, software, firmware, or any combinations thereof. Any of the steps, operations, or processes described herein may be performed or implemented with one or more hardware or software modules, alone or in combination with other devices.

Embodiments of the invention may also relate to a controller for performing the sensing and controlling the hardware devices described herein. This controller may be specially constructed for the required purposes, and/or it may comprise a general-purpose computing device selectively activated or reconfigured by a computer program stored in the computer. Such a computer program may be stored in a tangible computer readable storage medium, which includes any type of tangible media suitable for storing electronic instructions and coupled to a computer system bus. Furthermore, any controller referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A hypergravity thermal payload system for enabling melt or cooling of a sample under hypergravity, comprising:
- a thermal chamber, comprising a thermally conductive sample plate configured to hold a thermally non-conductive vial;
- a temperature sensor coupled with the thermal chamber to generate sensing data describing temperatures associated with the thermal chamber;
- a convective cover configured to enclose the thermal chamber to prevent thermal deviation;
- a thermoelectric device configured to heat or cool the thermal chamber;
- a heatsink configured to dissipate heat;
- a heat spreader configured to transfer heat from the thermal chamber to the heatsink; and
- a controller configured to:
  - receive and monitor the sensing data from the temperature sensor; and
  - control the thermoelectric device based in part on the monitored sensing data.

2. The hypergravity thermal payload system of claim 1, wherein the thermal payload system is placed on a centrifuge, and the convective cover is configured to prevent thermal deviation caused by rotation speed variation on the centrifuge.

3. The hypergravity thermal payload system of claim 1, further comprising a convective cover configured to enclose the thermal chamber.

4. The hypergravity thermal payload system of claim 1, further comprising a fan coupled with the heatsink to cause air to flow through the heatsink, accelerating dissipation of heat.

5. The hypergravity thermal payload system of claim 4, wherein the heat spreader is a passive heat spreader comprising copper.

6. The hypergravity thermal payload system of claim 4, wherein the heat spreader is an active heat spreader comprising a heat pipe configured to circulate a fluid inside the heat pipe.

7. The hypergravity thermal payload system of claim 1, wherein the temperature sensor is a resistive temperature detector.

8. The hypergravity thermal payload system of claim 1, further comprising a second temperature sensor coupled with the heatsink to generate second sensing data describing temperature of the heatsink.

9. The hypergravity thermal payload system of claim 8, wherein the controller is further configured to receive and monitor second sensing data from the second temperature sensor, and control the thermoelectric device further based on the monitored second sensing data.

10. The hypergravity thermal payload system of claim 9, wherein the controller is configured to:
- monitor whether the temperature of the heatsink is greater than a threshold temperature; and
- responsive to determining that the temperature of the heatsink is greater than the threshold temperature, preemptively stop the thermoelectric device, allowing the heatsink to cool down.

11. The hypergravity thermal payload system of claim 10, wherein the controller is configured to:
- responsive to determining that the temperature of the heatsink is lower than a second threshold temperature, restart the thermoelectric device.

12. The hypergravity thermal payload system of claim 1, wherein the thermoelectric device is configured to operate in a plurality of modes, and the controller causes the thermoelectric device to switch between the plurality of modes.

13. The hypergravity thermal payload system of claim 12, wherein the plurality of modes comprises (1) a first mode, in which the thermoelectric device is configured to rapidly reduce a temperature of a side of the thermal chamber by pumping heat to a side of the heatsink, (2) a second mode, in which the thermoelectric device operates in reverse at a first current to isolate the side of the thermal chamber from the heatsink, and (3) a third mode, in which the thermoelectric device operates in reverse at a second current greater than the first current to increase temperature of the thermal chamber.

14. The hypergravity thermal payload system of claim 1, wherein the sample plate is configured to hold a plurality of vials.

15. The hypergravity thermal payload system of claim 14, wherein the plurality of vials comprises a sample vial and a reference vial, the sample vial is configured to hold a sample, and temperature sensor is placed inside the reference vial for continuous monitoring temperature of the reference vial.

16. The hypergravity thermal payload system of claim 15, wherein the temperature sensor is covered with a material having similar thermodynamic characteristics as the sample contained in the sample vial.

17. The hypergravity thermal payload system of claim 15, wherein the sample vial comprises a thermally non-conductive balls in touch with the sample inside.

18. The hypergravity thermal payload system of claim 15, wherein the vials are made of polytetrafluoroethylene (PTFE).

19. The hypergravity thermal payload system of claim 14, wherein the vials are coated with polytetrafluoroethylene (PTFE).

20. The hypergravity thermal payload system of claim 14, wherein the vials are thermally conductive.

* * * * *